(12) United States Patent
Hixon

(10) Patent No.: US 7,359,841 B1
(45) Date of Patent: Apr. 15, 2008

(54) METHOD AND SYSTEM FOR THE EFFICIENT CALCULATION OF UNSTEADY PROCESSES ON ARBITRARY SPACE-TIME DOMAINS

(75) Inventor: Duane R. Hixon, Fairview Park, OH (US)

(73) Assignee: Hixon Technologies, Ltd., Fairview Park, OH (US)

( * ) Notice: Subject to any disclaimer, the term of this patent is extended or adjusted under 35 U.S.C. 154(b) by 892 days.

(21) Appl. No.: 10/176,878

(22) Filed: Jun. 21, 2002

Related U.S. Application Data

(60) Provisional application No. 60/299,897, filed on Jun. 21, 2001.

(51) Int. Cl.
*G06F 7/60* (2006.01)
*G06F 17/50* (2006.01)
*G06G 7/48* (2006.01)
*G06G 7/58* (2006.01)

(52) U.S. Cl. .................. 703/2; 703/1; 703/6; 703/9

(58) Field of Classification Search ............ 703/1, 703/6, 9, 12, 2
See application file for complete search history.

(56) References Cited

U.S. PATENT DOCUMENTS

| | | | | |
|---|---|---|---|---|
| 5,321,612 | A | * | 6/1994 | Stewart ............... 702/13 |
| 6,052,520 | A | * | 4/2000 | Watts, III ............ 703/10 |
| 6,674,432 | B2 | | 1/2004 | Kennon et al. |
| 6,810,370 | B1 | * | 10/2004 | Watts, III ............ 703/10 |
| 6,941,255 | B2 | | 9/2005 | Kennon et al. |
| 7,006,951 | B2 | | 2/2006 | Pond, Jr. et al. |
| 7,027,964 | B2 | | 4/2006 | Kennon |
| 7,043,413 | B2 | | 5/2006 | Ward et al. |
| 7,149,671 | B2 | | 12/2006 | Lim et al. |
| 2002/0067373 | A1 | | 6/2002 | Roe et al. |
| 2002/0072883 | A1 | | 6/2002 | Lim et al. |
| 2006/0025976 | A1 | | 2/2006 | Kennon et al. |

OTHER PUBLICATIONS

FEMLAB® User's Guide and Introduction. © 1994-1998 by Computer Solutions Europe AB. pp. i-ii, and 1-2 to 1-52, and 1-85 to 1-120.*

(Continued)

*Primary Examiner*—Paul Rodriguez
*Assistant Examiner*—Ayal Sharon
(74) *Attorney, Agent, or Firm*—Pearne & Gordon LLP

(57) ABSTRACT

The Space-Time Mapping Analysis (STMA) method and system provides an engineering method and/or system for modeling and/or analyzing and/or designing and/or building and/or operating complex physical processes, components, devices, and phenomena. STMA can be used in a way for modifying and/or improving the design of many different products, components, processes, and devices, for example. Any physical system, whether existing or proposed, which exhibits, for example, unsteady flow phenomena, might be modeled by the STMA. Thus, STMA can be implemented as a part of an engineering system for design improvements and/or modifications and/or evaluations. The STMA system and/or method uses a space-time mapping technique wherein the space and time directions are treated in an equivalent way, such that, rather than solving a three-dimensional unsteady problem by sweeping in the time direction from an initial point in time to a final point in time, the problem is solved as a four-dimensional problem in space-time.

86 Claims, 17 Drawing Sheets
(5 of 17 Drawing Sheet(s) Filed in Color)

OTHER PUBLICATIONS

FEMLAB® Model Library. © 1994-1998 by Computer Solutions Europe AB. pp. i-ii, and 2-2 to 2-11, and 2-29 to 2-37, 2-55 to 2-64, 2-95 to 2-103.*

FEMLAB® Reference Manual. © 1994-1998 by Computer Solutions Europe AB. pp. i-v, 3-66 to 3-68, and 3-75 to 3-81, and 4-73 to 4-101.*

FEMLAB® Documentation Index. © 1994-1998 by Computer Solutions Europe AB. pp. 1-1 to 1-8.*

Florea, R. and K. Hall, "Sensitivity Analysis of Unsteady Inviscid Flow Through Turbomachinery Cascades." AIAA Journal, vol. 39, No. 6, Jun. 2001, p.1047.*

T. Renyuan et al. "Computation on Transient Nonlinear Electromagnetic Field by an Improved Space-Time Finite Element Method." IEEE Transactions on Magnetics. May 1999. vol. 35, Issue 3, pp. 1426-1429.*

T.E. Tezduyar et al., "Computation of Unsteady Incompressible Flows with the Stabilized Finite Element Methods—Space-Time Formulations, Iterative Strategies and Massively Parallel Implementations", New Methods in Transient Analysis, ASME, New York (1992), pp. 7-24. Available at: http://www.mems.rice.edu/TAFSM/PUB_PRE/cALL/c21-PVPAMD92.pdf.*

T. Renyuan et al. "Analysis of Transient Non-Linear Eddy Current Fields by Space-Time Finite Element Method." IEEE Transactions on Magnetics. Sep. 1998. vol. 34, No. 5, pp. 2577-2580.*

T.E. Tezduyar, et al. "A New Strategy for Finite Element Computations Involving Moving Boundaries and Interfaces—The Deforming-Spatial-Domain / Space-Time Procedure: 1. The Concept and the Preliminary Numerical Tests." Computer Methods in Applied Mechanics and Engineering. 1992. vol. 94, pp.339-351.*

H. Weisman and J. Fish. "A Space-Time Multilevel Method For Molecular Dynamics Simulations." Preprint submitted to Elsevier Science. Feb. 1, 2006. http://www.scorec.rpi.edu/REPORTS/2006-1.pdf.*

G. Grün et al. "On Space-Time-Adaptive Convergent Finite-Element Schemes for a General Class of Lubrication-Type Equations." 5th World Conf. on Computational Mechanics (WCCM V). Jul. 7-12, 2002. http://citeseer.ist.psu.edu/577419.html.*

Golubev, V.V. and A. Rohde. "Application of Space-Time Mapping Analysis Method to Unsteady Nonlinear Gust-Airfoil Interaction Problem." AIAA 2003-3693. © 2003. http://www.microcfd.com/download/pdf/AIAA2003-3693.pdf.*

"MicroTunnel® a Virtual Wind Tunnel for the PC." © 2001 MicroCFD. http://www.microcfd.com/software.htm.*

"MicroCFD® Computational Fluid Dynamics Software and Consulting." © 2001 MicroCFD. http://www.microcfd.com.*

"Online Publications." http://www.microcfd.com/papers.htm. Printed Aug. 30, 2006. © 2001.*

Fried, I., "Finite-Element Analysis of Time-Dependent Phenonema", AIAA Journal, vol. 7, No. 6, pp. 1170-1173, Jul. 25, 1968.

Shakib, F., Hughes, T.J.R., and Johan, Z., "A New Finite-Element Formulation for Computational Fluid Dynamics: X. The Compressible Euler and Navier-Stokes Equations", Computer Methods in Applied Mechanics and Engineering, vol. 89, pp. 141-219, Nov. 7, 1990.

Finjany, A., Jensen, M., Rahmat-Samii, Y., and Barhen, J., "A Massively Parallel Computation Strategy for FDTD: Time and Space Parallelism Applied to Electromagnetic Problems", IEEE Transactions on Antennas and Propagation, vol. 43, No. 12, p. 1441, Apr. 4, 1994.

Zwart, P.J., Raithby, G.D., and Raw, M.J., "An Integrated Space-Time Finite Volume Method for Moving Boundary Problems", AIAA Paper 98-0518, 1998.

Ray, S.E., "A Model for the Interaction of a Fluid with Multiple Deformable Bodies", AIAA Paper 98-3155, 1998.

Behr, M. and Tezduyar, T., "The Shear-Slip Mesh Update Method", Computer Methods in Applied Mechanics and Engineering, vol. 174, pp. 261-274, Jan. 27, 1998.

Dompierre, J., Labbe, P., Garon, A., and Camarero, R., "Unstructured Tetrahedral Mesh Adaptation for Two-Dimensional Space-Time Finite Elements", AIAA Paper 2000-0810, 2000.

Behr, M. and Tezduyar, T., "Shear-Slip Mesh Update in 3D Computation of Complex Flow Problems with Rotating Mechanical Components", Computer Methods in Applied Mechanics and Engineering, vol. 190, pp. 3189-3200, Feb. 12, 1999.

Csik, A., Ricchiuto, M., Deconinck, H., and Poedts, S., "Space-Time Residual Distribution Schemes for Hyperbolic Conservation Laws", AIAA Paper 2001-2617, 2001.

N'dri, D., Garon, A., and Fortin, A., "Analysis of Mixed and Stabilized Space-Time Finite-Element Methods for the Navier-Stokes Equations", AIAA Paper 2001-0280, 2001.

Udoewa, V., Keedy, R., Tezduyar, T., Nonoshita, T., Stein, K., Benney, R., and Johnson, A., "Computational Aerodynamics of a Paratrooper Separating from an Aircraft", AIAA Paper 2001-2067, 2001.

Ray, S., "A Model of Fluid-Structure Interactions Including Contact for Interior Flow Applications", AIAA Paper 2000-2340, 2000.

Tam, C.K.W. and Webb, J.C., "Dispersion-Relation-Preserving Finite-Difference Schemes for Computational Acoustics", Journal of Computational Physics, vol. 107, pp. 262-281, Feb. 18, 1992.

Scott, James R., "Category 3, Problem 1: Single Airfoil Gust Response Problem", Third CAA Workshop on Benchmark Problems, NASA/CP-2000-209790, pp. 47-59. Aug. 2000.

* cited by examiner

METHOD AND SYSTEM FOR THE EFFICIENT CALCULATION OF UNSTEADY PROCESSES ON ARBITRARY SPACE-TIME DOMAINS

CROSS-REFERENCES TO RELATED APPLICATIONS

This application claims the benefit of provisional application Ser. No. 60/299,897, filed on Jun. 21, 2001, and incorporated herein by reference.

The disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO COMPUTER PROGRAM LISTING

A computer program listing is included as an appendix to this disclosure in the form of two compact discs labeled Hixon STMA COPY 1 and Hixon STMA COPY 2 respectively, created on Jun. 9, 2002, in MS-DOS and/or MS-Windows format, each containing the computer program modules as listed below, said modules in ASCII text format, with sizes and creation dates as listed below.

| File name | Size (bytes) | Date of creation |
|---|---|---|
| ACRAD_inflow_bc.f90 | 26958 | Jun. 9, 2002 |
| Allocate_Fluxes.f90 | 1675 | Jun. 9, 2002 |
| Allocate_Itn_Steps.f90 | 1273 | Jun. 9, 2002 |
| Allocate_Multigrid_Storage.f90 | 3842 | Jun. 9, 2002 |
| Allocate_RHS_terms.f90 | 2606 | Jun. 9, 2002 |
| blended_dissipation_coeffs.f90 | 4400 | Jun. 9, 2002 |
| Buffer_Setup.f90 | 109869 | Jun. 9, 2002 |
| Calc_Dissipation.f90 | 106163 | Jun. 9, 2002 |
| Calculate_Fluxes.f90 | 7766 | Jun. 9, 2002 |
| Calculate_Itn_Step.f90 | 8800 | Jun. 9, 2002 |
| Calculate_Residual.f90 | 49700 | Jun. 9, 2002 |
| Compact_6th_derivative.f90 | 31221 | Jun. 9, 2002 |
| Compact_6th_module.f90 | 4261 | Jun. 9, 2002 |
| data_modules.f90 | 12088 | Jun. 9, 2002 |
| Deallocate_Variables.f90 | 4720 | Jun. 9, 2002 |
| exp_10_filter.f90 | 2701 | Jun. 9, 2002 |
| Explicit_10th_filter.f90 | 31457 | Jun. 9, 2002 |
| Explicit_2nd_derivative.f90 | 14306 | Jun. 9, 2002 |
| Explicit_2nd_module.f90 | 1665 | Jun. 9, 2002 |
| Explicit_6th_derivative.f90 | 44326 | Jun. 9, 2002 |
| Explicit_6th_module.f90 | 4565 | Jun. 9, 2002 |
| Explicit_DRP_derivative.f90 | 35123 | Jun. 9, 2002 |
| Explicit_DRP_module.f90 | 3059 | Jun. 9, 2002 |
| FAST_Output_Module.f90 | 3233 | Jun. 9, 2002 |
| Filter_Flow_Variables.f90 | 17239 | Jun. 9, 2002 |
| Find_Buffer_Shifts.f90 | 9893 | Jun. 9, 2002 |
| Flow_Buffer_Transfer.f90 | 6604 | Jun. 9, 2002 |
| Flux_Buffer_Transfer.f90 | 7574 | Jun. 9, 2002 |
| Format_Statements | 3710 | Jun. 9, 2002 |
| Get_Flow_Delta.f90 | 28327 | Jun. 9, 2002 |
| Get_Flow_Update.f90 | 33687 | Jun. 9, 2002 |
| Ghost_Point_Initialization.f90 | 4500 | Jun. 9, 2002 |
| Giles_BC.f90 | 31510 | Jun. 9, 2002 |
| Grid_Buffer_Transfer.f90 | 9765 | Jun. 9, 2002 |
| Grid_Metrics_Calc.f90 | 30271 | Jun. 9, 2002 |
| Initialize_Flow.f90 | 8514 | Jun. 9, 2002 |
| Inviscid_Wall_bc.f90 | 36080 | Jun. 9, 2002 |
| Jameson_type_Dissipation.f90 | 35872 | Jun. 9, 2002 |
| main.f90 | 4322 | Jun. 9, 2002 |
| makefile | 12303 | Jun. 9, 2002 |
| Metric_Buffer_Transfer.f90 | 13423 | Jun. 9, 2002 |
| Multigrid_Data_Transfer.f90 | 67956 | Jun. 9, 2002 |
| Multigrid_FMG_Start.f90 | 2288 | Jun. 9, 2002 |
| Multigrid_V_Cycle.f90 | 7108 | Jun. 9, 2002 |
| Read_Grid.f90 | 5175 | Jun. 9, 2002 |
| Read_Input_File.f90 | 28227 | Jun. 9, 2002 |
| Residual_Smoothing.f90 | 9672 | Jun. 9, 2002 |
| Restart_Module.f90 | 8073 | Jun. 9, 2002 |
| Runge_Kutta_4.f90 | 7227 | Jun. 9, 2002 |
| Set_Flow_Ghost_Points.f90 | 5739 | Jun. 9, 2002 |
| Set_Flux_Ghost_Points.f90 | 6875 | Jun. 9, 2002 |
| Set_Grid_Ghost_Points.f90 | 4766 | Jun. 9, 2002 |
| Spatial_Diff_Module.f90 | 827 | Jun. 9, 2002 |
| Time_inflow_bc.f90 | 14573 | Jun. 9, 2002 |
| TW_outflow_bc.f90 | 11753 | Jun. 9, 2002 |
| variable_def.f90 | 690 | Jun. 9, 2002 |
| VTK_Output_Module.f90 | 14770 | Jun. 9, 2002 |

Said computer program listing modules are herein incorporated by reference into this disclosure.

This invention relates generally to a method and/or a system for calculating the solution of unsteady partial differential equations and/or integral equations, said equations representing a physical process in a physical system.

More specifically, this invention utilizes a method for evaluating and enhancing the engineering and design of physical systems when those physical systems contain mathematically describable physical processes. These physical processes are typically described by using unsteady partial differential and/or integral equations. The invention provides a method for the more accurate solution of those unsteady partial differential and/or integral equations in space-time, typically utilizing one or more computers to solve these equations in space-time.

BACKGROUND OF THE INVENTION

Historically, mathematical analysis has often been used to determine the behavior of physical systems. Unsteady partial differential and/or integral equations are often utilized for that purpose. Examples of such equations commonly solved to determine the behavior of physical processes of physical systems include:

a) The Navier-Stokes equations for fluid flow, including the flow of air, water, and/or oil;

b) The Maxwell equations for electromagnetic propagation and radiation;

c) Chemical reaction equations such as those used for combustion;

d) Newton's equations for the motion of satellites and heavenly bodies;

e) The equations of structural dynamics for the deflections and vibration of structural members; and f) The Boltzmann equations for molecular dynamics.

The solutions of these equations are obtained in order to improve the manufacturing and/or engineering and/or performance of processes and/or products, such as quieter submarine propellers or helicopter rotors, quieter HVAC systems in buildings, more efficient engines, engines with lower emissions, more efficient airplane wings, improved electronic circuit boards, improved radar and sonar arrays, and improved aircraft structures, improved manufacturing processes, among others.

Because these equations typically do not have general analytic solutions, the equations are typically solved discretely on programmable computers. Other solution methods, such as using analog computers, have also been used to solve these equations.

There are many manufacturing processes and/or products whose performance and/or efficiency can be predicted by solving unsteady partial differential or integral equations. In these processes or products, an incremental increase in efficiency may have a very large impact on the costs of manufacturing and/or use over the life of the product; thus, fast and efficient solution procedures for unsteady partial differential or integral equations are useful to investigate possible improvements, for example, in efficiency.

In order to solve unsteady partial differential equations on computers, many solution techniques have been developed. To account for the time-dependent nature of the problem, at least two methods are currently used at the time of the writing of this application:

In the first method, the problem is solved by prescribing an analytic function for the time variation of the solution. For example, if the problem is periodic, a periodic function is substituted in for the unsteady terms in the partial differential equation. This approach is usually limited to linear problems with relatively simple solutions.

In the second, more commonly used method, no assumptions are made concerning the form of the time variation of the solution; instead, a local interpolant is used at each time level to represent the time variation of the solution. In this method, the spatial solution at a given time level is used to determine the instantaneous time rate of change of the solution at that time level, and the solution is discretely marched in time from that time level by using the time rate of change of the solution computed at each new time level to evolve the solution to the next time level.

This second method is much more general, but has deficiencies of its own. If the solution is being marched in time, the computer time required to solve a problem increases rapidly with the amount of resolution required to accurately represent the unsteady evolution of the solution; thus, if there is a region in the solution domain where the solution is rapidly changing in time, resolving the unsteadiness in this region by using smaller time steps will greatly increase the computer time required to solve the problem because all points in the solution domain will be marched at this small time step. Also, if the physical problem has a complex geometry which requires computational grids that are moving with respect to each other, the information transfer process at the interfaces between moving and stationary grids will require an interpolation method to be employed. Finally, the amount of parallelism in the problem is limited by the amount of spatial grid points at each time level; thus, solving the problem on parallel computers gives only a limited speedup.

A solution method for unsteady partial differential or integral equations that is general, allows for complex problems to be accurately and efficiently solved, and is parallel in nature is desired. This, in turn, allows manufacturers to improve the efficiency of both their manufacturing processes and the products themselves at a much lower cost than before.

An unsteady two-dimensional partial differential equation can be written in this form:

$$\frac{\partial Q}{\partial t} + \frac{\partial F}{\partial x} + \frac{\partial G}{\partial y} = S \qquad \text{(EQ1)}$$

In EQ1, t represents time and x and y represent the Cartesian spatial dimensions. Q is the variable or variables to be solved for, representing the physical quantity or quantities of interest; here F, G, and S are functions of Q, x, y, and t. It is important to note that EQ1 is presented for illustrative purposes; unsteady partial differential equations may have more or fewer variables, more or fewer spatial dimensions, and more or fewer terms in the equations.

The Euler equations of fluid flow are one example of a commonly-used unsteady partial differential equation. The two-dimensional conservative Euler equations in Cartesian coordinates can be written as:

$$\frac{\partial}{\partial t}\begin{Bmatrix} \rho \\ \rho u \\ \rho v \\ E \end{Bmatrix} + \frac{\partial}{\partial x}\begin{Bmatrix} \rho u \\ \rho u^2 + p \\ \rho u v \\ u(E+p) \end{Bmatrix} + \frac{\partial}{\partial y}\begin{Bmatrix} \rho v \\ \rho u v \\ \rho v^2 + p \\ v(E+p) \end{Bmatrix} = 0, \qquad \text{(EQ 2)}$$

where the Q vector consists of the density ($\rho$), the flow momentums in the x and y directions ($\rho u$ and $\rho v$), and the total energy of the flow (E).

In order to solve an unsteady partial differential equation such as EQ1 on a computer, it is typically necessary to transform the analytic, continuous equations into their discrete numerical counterparts. In this way, instead of solving the equations everywhere, the solution is calculated only at specified points. To locate these points, a computational grid is generated. This grid covers the spatial domain, and usually contains, at most, only a few time levels. Given a grid, the discrete equations are then solved at every point or in every cell in the grid. If the differential form of the equations are to be solved, methods such as the spectral method or finite differences may be used to solve the differential equations. If the equations are to be solved in integral form, methods such as finite volume, finite element, lattice gas, or Direct Simulation Monte Carlo (DSMC) methods may be used to solve the integral equations. For illustration, finite differences will be used on the differential form of the equations; the other methods are direct extensions of this development, and are known in the art.

Using second order central finite differences in space and first-order backward finite differences in time, the derivatives at point (i,j,n) are written as:

$$\left.\frac{\partial Q}{\partial t}\right|_{i,j,n} = \frac{Q_{i,j,n+1} - Q_{i,j,n}}{\Delta t} \qquad \text{(EQ 3)}$$

$$\left.\frac{\partial F}{\partial x}\right|_{i,j,n} = \frac{F_{i+1,j,n} - F_{i-1,j,n}}{2\Delta x}$$

$$\left.\frac{\partial G}{\partial y}\right|_{i,j,n} = \frac{G_{i,j+1,n} - G_{i,j-1,n}}{2\Delta y}$$

By using these particular finite difference representations, the local form of the solution is assumed to be a quadratic function in space and a linear function in time.

Note that the differencing method presented in EQ3 assumes a rectangular grid in the x and y directions with equal spacing between grid points in each direction. In EQ3, $\Delta x$ is the spacing between grid points in the x direction, $\Delta y$ is the spacing between grid points in the y direction, and $\Delta t$ is the spacing between grid levels in time. Also, i is an index that represents grid points in the x-direction, j is an index that represents grid points in the y-direction, and n is an index that represents the time level.

Alternatively, if the problem has a known temporal variation T(t) and is linear, the variables may be separated as:

$Q(x,y,t) = q(x,y)T(t)$ $F(x,y,t) = f(x,y)T(t)$ $G(x,y,t) = g(x,y)T(t)$ $S(x,y,t) = s(x,y)T(t)$ (EQ4)

and the equation rewritten as:

$$q\frac{\partial T}{\partial t} + T\frac{\partial f}{\partial x} + T\frac{\partial g}{\partial y} = sT \quad \text{(EQ 5)}$$

Because T(t) is known, this reduces the equation from three dimensions to two and greatly speeds the solution process. However, the temporal variation is usually known beforehand only for very simple processes, and this method is not generally applicable. Thus, a time-marching procedure is usually used.

Using the differencing procedure from EQ3 in the partial differential equation presented in EQ1, a marching procedure in time can be written as:

$$Q_{i,j,n+1} = Q_{i,j,n} + \Delta t \left( S|_{i,j,n} - \frac{\partial F}{\partial x}\bigg|_{i,j,n} - \frac{\partial G}{\partial y}\bigg|_{i,j,n} \right) \quad \text{(EQ 6)}$$

The time marching procedure can be done either explicitly, using the solution at the current time level n to obtain the solution at the next time level:

$$Q_{i,j,n+1} = Q_{i,j,n} + \Delta t \left( S|_{i,j,n} - \frac{\partial F}{\partial x}\bigg|_{i,j,n} - \frac{\partial G}{\partial y}\bigg|_{i,j,n} \right) \quad \text{(EQ 7)}$$

or implicitly, using the solution at the next time level n+1 to obtain the solution at the next time level:

$$Q_{i,j,n+1} = Q_{i,j,n} + \Delta t \left( S|_{i,j,n+1} - \frac{\partial F}{\partial x}\bigg|_{i,j,n+1} - \frac{\partial G}{\partial y}\bigg|_{i,j,n+1} \right) \quad \text{(EQ 8)}$$

Since the solution at the next time level is not known, either an iterative process or a direct solution of matrix equations is required to obtain the solution at the next time level. In an iterative process, an initial guess is made for the solution of the equations at the new time level. This initial solution is used to calculate an improved solution at the new time level, which is then used to calculate a more improved solution, and so on. This process continues until the difference in the input solution and the revised solution is small. An example of an iterative process is:

$$Q_{i,j,n+1}^{l+1} = Q_{i,j,n+1}^{l} + \omega(S|_{i,j,n+1}^{l} - \frac{\partial Q}{\partial t}\bigg|_{i,j,n+1}^{l} - \frac{\partial F}{\partial x}\bigg|_{i,j,n+1}^{l} - \frac{\partial G}{\partial y}\bigg|_{i,j,n+1}^{l}) \quad \text{(EQ 9)}$$

where l and l+1 refer to the input solution and revised solution at the new time level n+1. Here, ω is a factor used to accelerate the convergence of the iterative process. Notice that the time derivative term has now been moved to the right-hand-side of the equation.

There are advantages and disadvantages to each method of time marching. The explicit time marching method requires much fewer calculations per time step, but the time step size Δt is limited by the grid spacing Δx and Δy due to numerical stability constraints. The implicit time marching methods used usually do not have the step size restriction, allowing fewer time steps, each of which require much more calculations to perform.

Since, for realistic problems, it is imperative that grid points be placed about complex geometries, and clustered in regions of interest, the equations are rewritten in a way that allows an arbitrary grid to be used. One way of accomplishing this, given for illustrative purposes, is by mapping the equations into generalized curvilinear coordinates (ξ,η,τ):

$\xi = \xi(x,y,t)$ $\eta = \eta(x,y,t)$ $\tau = t$ (EQ10)

Using the chain rule for derivatives, the equations can be rewritten as:

$$\frac{\partial Q}{\partial \tau} + \frac{\partial Q}{\partial \xi}\frac{\partial \xi}{\partial t} + \frac{\partial Q}{\partial \eta}\frac{\partial \eta}{\partial t} + \\ \frac{\partial F}{\partial \xi}\frac{\partial \xi}{\partial x} + \frac{\partial F}{\partial \eta}\frac{\partial \eta}{\partial x} + \frac{\partial G}{\partial \xi}\frac{\partial \xi}{\partial y} + \frac{\partial G}{\partial \eta}\frac{\partial \eta}{\partial y} = S \quad \text{(EQ 11)}$$

The equations are usually transformed into strongly conservative form to retain the numerical conservation properties of the original equation:

$$\frac{\partial}{\partial \tau}\left(\frac{Q}{J}\right) + \\ \frac{\partial}{\partial \xi}\left(\frac{\partial \xi}{\partial t}\frac{Q}{J} + \frac{\partial \xi}{\partial x}\frac{F}{J} + \frac{\partial \xi}{\partial y}\frac{G}{J}\right) + \\ \frac{\partial}{\partial \eta}\left(\frac{\partial \eta}{\partial t}\frac{Q}{J} + \frac{\partial \eta}{\partial x}\frac{F}{J} + \frac{\partial \eta}{\partial y}\frac{G}{J}\right) = \frac{S}{J} \quad \text{(EQ 12)}$$

where J is the Jacobian of the transformation, and is dependent on the grid metrics at each time level.

Again, these equations are usually marched in time, either explicitly or implicitly. For example, the implicit time marching method would be:

$$\left.\frac{Q}{J}\right|^{l+1}_{i,j,n+1} = \left.\frac{Q}{J}\right|^{l}_{i,j,n} + \quad \text{(EQ 13)}$$

$$\omega \begin{pmatrix} \left.\frac{S}{J}\right|^{l}_{i,j,n} - \frac{\left(\left.\frac{Q}{J}\right|^{l}_{i,j,n+1} - \left.\frac{Q}{J}\right|_{i,j,n}\right)}{\Delta t} \\ - \frac{\left(\frac{\partial \xi}{\partial t}\frac{Q}{J} + \frac{\partial \xi}{\partial x}\frac{F}{J} + \frac{\partial \xi}{\partial y}\frac{G}{J}\right)^{l}_{i+1,j,n} - \left(\frac{\partial \xi}{\partial t}\frac{Q}{J} + \frac{\partial \xi}{\partial x}\frac{F}{J} + \frac{\partial \xi}{\partial y}\frac{G}{J}\right)^{l}_{i-1,j,n}}{2\Delta \xi} \\ - \frac{\left(\frac{\partial \eta}{\partial t}\frac{Q}{J} + \frac{\partial \eta}{\partial x}\frac{F}{J} + \frac{\partial \eta}{\partial y}\frac{G}{J}\right)^{l}_{i,j+1,n} - \left(\frac{\partial \eta}{\partial t}\frac{Q}{J} + \frac{\partial \eta}{\partial x}\frac{F}{J} + \frac{\partial \eta}{\partial y}\frac{G}{J}\right)^{l}_{i,j-1,n}}{2\Delta \eta} \end{pmatrix}$$

Note that in EQ13, the i index is now associated with the $\xi$ direction, and the j index with the $\eta$ direction. This is because the effect of the mapping is to transform an arbitrary grid in the physical plane (x,y,t) to a uniformly-spaced Cartesian grid in the computational plane ($\xi,\eta,\tau$). It is important to note, however, that the n index is still associated with the time direction.

There are other methods of mapping the equations, such as spectral element, finite element, unstructured grid methods, or methods using cells such as lattice-gas or DSMC, but they share at least one attribute: The mapping methods all map the equations in space separately from time; thus, each space-time grid cell has at least one face that is normal to the time direction. To illustrate this, notice that in EQ12 the time direction $\tau$ has no transformation metrics; it is defined in EQ10 to be identical to the physical time.

In the prior art, there has been some investigation of the possibility of considering the unsteady problem as a space-time volume to be solved, instead of as a spatial volume to be marched in time. The concept of solving unsteady problems by gridding in space-time was initially published by Fried (1969), and the use of space-time grids to solve unsteady fluid, electromagnetic, and structural equations for 'slabs' of space-time has been gaining prominence since 1991. Some examples of the prior disclosures in this area are given in:

Fried, I. (1969) 'Finite-Element Analysis of Time-Dependent Phenomena', AIAA Journal, Vol. 7, No. 6, p. 1170-1173.

Shakib, F., Hughes, T. J. R., and Johan, Z. (1991) 'A New Finite-Element Formulation for Computational Fluid Dynamics: X. The Compressible Euler and Navier-Stokes Equations', Computer Methods in Applied Mechanics and Engineering, Vol. 89, p. 141-219;

Fijany, A., Jensen, M., Rahmat-Samii, Y., and Barhen, J. (1995) 'A Massively Parallel Computation Strategy for FDTD: Time and Space Parallelism Applied to Electromagnetic Problems', IEEE Transactions on Antennas and Propagation, Vol. 43, No. 12, p. 1441.

Zwart, P. J., Raithby, G. D., and Raw, M. J. (1998), 'An Integrated Space-Time Finite Volume Method for Moving Boundary Problems', AIAA Paper 98-0518.

Ray, S. E. (1998) 'A Model for the Interaction of a Fluid with Multiple Deformable Bodies', AIAA Paper 98-3155.

Behr, M. and Tezduyar, T. (1999) 'The Shear-Slip Mesh Update Method', Computer Methods in Applied Mechanics and Engineering, Vol 174, p. 261-274.

Dompierre, J., Labbe, P., Garon, A., and Camarero, R. (2000) 'Unstructured Tetrahedral Mesh Adaptation for Two-Dimensional Space-Time Finite Elements', AIAA Paper 2000-0810, 2000.

Dompierre, J., Labbe, P., Garon, A., and Camarero, R. (2000) 'Unstructured Tetrahedral Mesh Adaptation for Two-Dimensional Space-Time Finite Elements', AIAA Paper 2000-0810, 2000.

Behr, M. and Tezduyar, T. (2001) 'Shear-Slip Mesh Update in 3D Computation of Complex Flow Problems with Rotating Mechanical Components', Computer Methods in Applied Mechanics and Engineering, Vol. 190, p. 3189-3200.

Csik, A., Ricchiuto, M., Deconinck, H., and Poedts, S. (2001) 'Space-Time Residual Distribution Schemes for Hyperbolic Conservation Laws', AIAA Paper 2001-2617, 2001.

N'dri, D., Garon, A., and Fortin, A. (2001) 'Analysis of Mixed and Stabilized Space-Time Finite-Element Methods for the Navier-Stokes Equations', AIAA Paper 2001-0280, 2001.

Udoewa, V., Keedy, R., Tezduyar, T., Nonoshita, T., Stein, K., Benney, R., and Johnson, A. (2001) 'Computational Aerodynamics of a Paratrooper Separating from an Aircraft', AIAA Paper 2001-2067, 2001.

Ray, Stephen E. (2000) 'A Model of Fluid-Structure Interactions Including Contact for Interior Flow Applications', AIAA Paper 2000-2340, 2000.

However, one thing that is common to all of the above, along with most other previous approaches, is that the space-time grids always have a well-defined time direction, wherein each space-time grid cell has at least one face that is normal to the time direction.

This feature of the mapping has a direct impact on the grids, and hence the methods that are currently used to discretely solve unsteady partial differential equations. The effect that this mapping has on the current methods of solving problems of practical interest is illustrated in the following examples:

a) Processes with a wide range of length and time scales. An example of this type of process would be the determination of the flow and noise produced in an automobile ventilation system duct. In this case, the flow in the center of the duct will be relatively smooth and uniform, being affected by the geometry of the duct. In contrast, the flow near the duct wall will be highly turbulent, with many tiny eddies and vortices. This region of the flow will determine if the main flow in the duct separates from the wall as the duct turns. The resulting separation bubble will reduce the flow through the duct and generate a large amount of noise. To accurately calculate a flow of this nature requires the highly unsteady flow near the wall to be well resolved in space and time; this results in very small grid spacing near the wall and very small time steps. Using currently available technology, there are two choices: either the entire spatial domain is marched at the small time step, or a multiple-time-stepping method is used. Marching the entire domain at the small time step requires a very large amount of computer time, which is undesirable. Using a multiple-time-stepping method allows each region of the grid to be marched at different time steps and synchronized occasionally. This reduces the amount of CPU time required. However, this method introduces computer logic and interpolation issues and is not easily parallelized; thus it has been rarely used.

b) Processes with moving and stationary bodies. An example of this type of problem would be the bypass flow in a jet aircraft engine. In a jet engine, there is flow that enters the engine inlet, but does not have fuel added. This flow is spun and given thrust from a large spinning fan (the rotor), and the flow is straightened to exit the engine cleanly by a stationary blade row (the stator). The engine performance and noise radiation is dependent on the design of the rotor/stator combination. To calculate the flow through this geometry, two grids are usually generated. The first grid is attached to the rotor, and spins with it. The second grid is attached to the stator, and is stationary. Where the two grids meet, one grid is spinning, while the other is stationary; thus, at each time level, the spinning grid has moved with respect to the stationary grid at the interface where they meet. In order to accurately calculate the flow through this grid interface, information must be transferred between the two grids at each time level. Since the grids are moving with respect to each other, an interpolation process must be used at each time step in order to transfer data accurately between the two grids. This interpolation process requires special computer programs to be written and used, and this process adds computer time and complexity to the solution procedure. In existing codes, this interpolation process limits the time step below the time step that the code could normally use, and hence adds to the solution time required. Another group of methods, used in finite-element and finite-volume approaches, use a space-time approach to gridding and solving problems of this class. In the space-time approach, the problem is divided into 'slabs' of space-time volume, each of which contain two or more time levels (the 'n' and 'n+1' levels). Each space-time slab allows the spatial grid to change the number and location of grid points from the $n^{th}$ time level to the $(n+1^{st})$ time level. While this method does allow the possibility of generating grids which do not require interpolation, generating these grids is a highly complex problem, and the method is not widely used.

c) Processes where the flow in a small region over a short period of time completely determines the resulting performance. An example of this type of problem is the aerodynamic performance of a fighter aircraft that is pitching up rapidly. In this maneuver, the aircraft can dynamically generate a large amount of lift and climb very rapidly before the aircraft stalls and loses lift (dynamic stall). This stall process begins when the flow separates near the leading edge of the wing, forming a small separation bubble. The separation bubble quickly spreads across the upper surface of the wing, and the lift is sharply reduced. The area of separation, and the rate at which it spreads, is influenced greatly by the initial separation bubble, which is very small and occurs very quickly. The unknown location and formation time of the initial separation bubble makes this flow very difficult to compute accurately. Since the existing unsteady methods march in time, there is only one opportunity to capture the location and dynamics of the separation bubble. In order to ensure that this occurs, a very dense grid and a very small time step must be used, adding greatly to the computer time required for this problem. Again, if a single-time-stepping method is used, all of the grid points in the entire grid must be updated for each very small time step even though only the points in close proximity to the separation bubble require such high resolution. Even with a multiple-time-stepping method, the region of high resolution must be continuously expanded as the separation bubble grows, adding great complexity to the process.

d) Processes where two or more sets of governing equations interact. An example of this would be the problem of aircraft wing flutter. In this process, the lift on the wing of an airplane causes the wing to bend, which then reduces the lift, allowing the wing to spring back, which then causes the wing to produce more lift and bend upward again. This process can repeat until the wing fails. To calculate the dynamic flutter of a wing, both the Navier-Stokes equations for the flow around the wing and the structural equations for the deflections of the wing structure itself must be calculated simultaneously, and the solutions of each equation affects the other. To do this, both equations are solved at each time step, with the resulting wing motion used to recalculate the grid for the aerodynamic solver. This type of calculation can take a very long time to converge to a limit cycle using a time marching approach.

e) Processes where all of the above occur. In a worst case, all of these problems occur. A common process which contains all of these problems is the flow and combustion inside an four-stroke reciprocating internal combustion engine. First, the range of time and length scales is very large, due to the extreme rapidity with which combustion occurs. The flow is moving at the speed of the piston, which is at most 20 meters per second but is near zero as the piston nears the top of its stroke, while the combustion flame front moves at a supersonic speed during detonation, which is greater than 1500 meters per second. The time scales are even more disparate, as combustion occurs very rapidly. Thus, the problem must be done either with multiple-time-stepping with their added complexity or implicit methods with their loss of accuracy. Second, there are moving and stationary bodies which must have grids wrapped around them to accurately account for the effect of these bodies on the flow. The piston is moving up and down in the stationary cylinder, and the intake and exhaust valves are opening and closing in the stationary cylinder head. The gridding and interpolation issues for the engine cycle are thus very complex and time-consuming. Again, the interpolation issues could be avoided by using the space-time mapping methods discussed in Example (b) above, but at a cost of higher grid complexity. Third, the combustion process has a very large effect on the pollution and performance produced by the engine. Combustion begins in a very small region near the spark plug, and the flame front rapidly expands throughout the cylinder. However, if there are hot spots in the cylinder, detonation may occur at the hot spot, causing another ignition source and flame front. The propagation of the flame front is also complex. The flame front is not a smooth sphere; instead, it is wrinkled locally due to turbulence in the cylinder. This turbulence accelerates or decelerates the flame front, and has an effect on the total performance of the engine. To capture this process requires a very small time step and a large number of grid points—and thus a very long computer run time. Fourth, the piston motion is determined from the pressures in the cylinder; thus, the structural equations of motion must be solved in parallel with the combustion equations and the Navier-Stokes equations for the flow. These problems make the calculation of the performance of an internal combustion engine very complex and time-consuming, and there are very few computer codes which can do this with high accuracy.

SUMMARY OF THE INVENTION

Provided is a method for obtaining values of state variables in a volume of space-time for a physical system (proposed or existing), wherein the physical system is describable by at least one governing unsteady partial differential or integral equation. The method provides time-dependent values of the state variables of the physical system. The method is comprised of the steps of:

determining the at least one equation describing the physical system (which can include equations in a form of the Navier-Stokes equations of fluid flow, governing equations of structural dynamics, Maxwell equations of electromagnetics, and/or Boltzmann equations of molecular dynamics or some simplified version of these equations);

determining a total volume of space-time in which the values of the state variables are to be obtained, the volume of space-time associated with a spatial geometry of the physical system over some period of time;

discretizing the at least one equation to allow a numerical solution of the at least one equation in the space-time volume on a computational grid;

generating the computational grid comprising cells or elements for completely filling the total volume of space-time, the cells or elements having faces which are oriented in any direction in space and time;

placing the cells or elements in the total volume of space-time in such a manner so as to allow for the numerical solution, the cells or elements to be concentrated or clustered to adequately resolve the changing values of the state variables in space and time; and obtaining the values of the state variables by solving the discretized at least one governing unsteady partial differential or integral equation on the computational grid thereby providing the numerical solution.

Also provided is a method for aiding the design of a physical system. The method is comprised of the steps of:

obtaining values of state variables in a volume of space-time for a physical system, wherein the physical system is describable by at least one governing unsteady partial differential or integral equation. The method provides time-dependent values of the state variables of the physical system. The method for obtaining the values of state variables includes the steps of:

determining the at least one partial differential or integral equation describing the physical system;

determining a total volume of space-time in which the values of the state variables are to be obtained, the volume of space-time associated with a geometry of the physical system over some period of time;

discretizing the at least one partial differential or integral equation to allow a numerical solution of the at least one partial differential or integral equation in the volume on a computational grid;

generating the computational grid comprising cells or elements, the cells or elements having faces which are oriented in any direction in space and time;

placing the cells or elements in the total volume of space-time in such a manner so as to allow for the numerical solution; and obtaining the values of the state variables by solving the discretized at least one partial differential or integral equation on the computational grid thereby providing the numerical solution;

engineering a revised design of the physical system utilizing the numerical solution, whereby the physical system thereby encompasses the revised design; and iterating over steps A and B until a determination is made that said physical system is at a satisfactory or sufficient design state to stop (such that no further analysis using the method is necessary or desired).

Further provided is a method for evaluating an existing or proposed apparatus. The apparatus is describable by at least one governing partial differential or integral equation. The method provides time-dependent values of state variables used for evaluating the apparatus. The method uses one or more programmable computers and comprises the steps of:

determining the at least one equation describing the apparatus;

determining a total volume of space-time in which the values of the state variables are to be obtained, the volume of space-time associated with a spatial geometry of the apparatus over some period of time;

discretizing the at least one equation to allow a numerical solution of the at least one equation in the space-time volume on a computational grid;

generating the computational grid comprising cells or elements for substantially filling the total volume of space-time, the cells or elements having faces which are oriented in any direction in space and time;

placing the cells or elements in the total volume of space-time in such a manner so as to allow for the numerical solution, the cells or elements to be concentrated or clustered to adequately resolve the changing values of the state variables in space and time; and obtaining the values of the state variables by solving the discretized at least one governing unsteady partial differential or integral equation on the computational grid using the one or more programmable computers, thereby providing the numerical solution.

Still further provided is a method for obtaining values of state variables in a volume of space-time for a physical system being analyzed. The method uses one or more programmable computers, wherein the physical system is describable by at least one governing unsteady partial differential or integral equation. The method provides time-dependent values of the state variables of the physical system. The method is comprised of the steps of:

determining the at least one equation describing the physical system;

determining a total volume of space-time in which the values of the state variables are to be obtained, the volume of space-time associated with a spatial geometry of the physical system over some period of time;

discretizing the at least one equation to allow a numerical solution of the at least one equation in the space-time volume on a computational grid;

generating the computational grid comprising cells or elements for completely filling the total volume of space-time, the cells or elements having faces which are oriented in any direction in space and time;

placing the cells or elements in the total volume of space-time in such a manner so as to allow for the numerical solution, the cells or elements to be concentrated or clustered to adequately resolve the changing values of the state variables in space and time; and using the one or more programmable computers for obtaining the values of the state variables by solving the discretized at least one governing unsteady partial differential or integral equation on the computational grid thereby providing the numerical solution.

Even further provided are various embodiments of the above methods directed at specific engineering and design problems and analysis, including, but not limited to: problems for solving design and/or performance analysis of an internal combustion engine; design and/or performance analysis of a lubricated bearing; design and/or performance analysis of an artificial heart, kidney, or blood vessel; design and/or performance analysis of a manufacturing process for a VLSI chip; and design and/or performance analysis of a spray nozzle.

Provided in addition is an article of manufacture recorded on a computer-readable medium for programming one or more computers for use for obtaining values of unsteady flow properties to be obtained for a volume of space-time for a system. The system is describable by one or more unsteady flow equations.

The time-dependent values of the state variables describing the system are determined by performing the steps of:

determining the one or more equations describing the system;

determining a total volume of space-time in which the values of the unsteady flow properties are to be obtained, the volume of space-time associated with a geometry of the physical system over some period of time;

discretizing the one or more unsteady flow equations to allow a numerical solution of the one or more unsteady flow equations in the space-time volume on a computational grid;

generating the computational grid comprising cells or elements, the cells or elements having faces which are oriented in any direction in space and time; and placing the cells or elements in the total volume of space-time in such a manner to allow for the numerical solution.

The article of manufacture is comprised of means for instructing the one or more computers to obtain the values of the state variables by solving the discretized one or more unsteady flow equations on the computational grid, thereby providing the numerical solution.

Further provided is a system including a programmed computer for obtaining values of state variables in a volume of space-time for a physical system. The physical system is describable by at least one governing unsteady partial differential or integral equation. The method provides time-dependent values of the state variables of the physical system. The system comprises:

means for determining the at least one equation describing the physical system;

means for determining a total volume of space-time in which the values of the state variables are to be obtained, the volume of space-time associated with a geometry of the physical system over some period of time;

means for discretizing the at least one equation to allow a numerical solution of the at least one equation in the space-time volume on a computational grid;

means for generating the computational grid comprising cells or elements, the cells or elements having faces which are oriented in any direction in space and time;

means for placing the cells or elements in the total volume of space-time in such a manner so as to allow for the numerical solution; and one or more computers programmed for obtaining the values of the state variables by solving the discretized at least one governing unsteady partial differential or integral equation on the computational grid thereby providing the numerical solution.

Finally, still further provided is a system including a programmed computer for obtaining values of unsteady flow properties to be obtained for a volume of space-time for a physical system. The physical system is describable by one or more unsteady flow equations, including one or more of Navier-Stokes equations of fluid flow and a simplified form of the Navier-Stokes equations for fluid flow. The engineering system provides time-dependent values of the state variables describing the physical system, comprising similar means as those provided hereinabove.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE INVENTION

Figure 1:
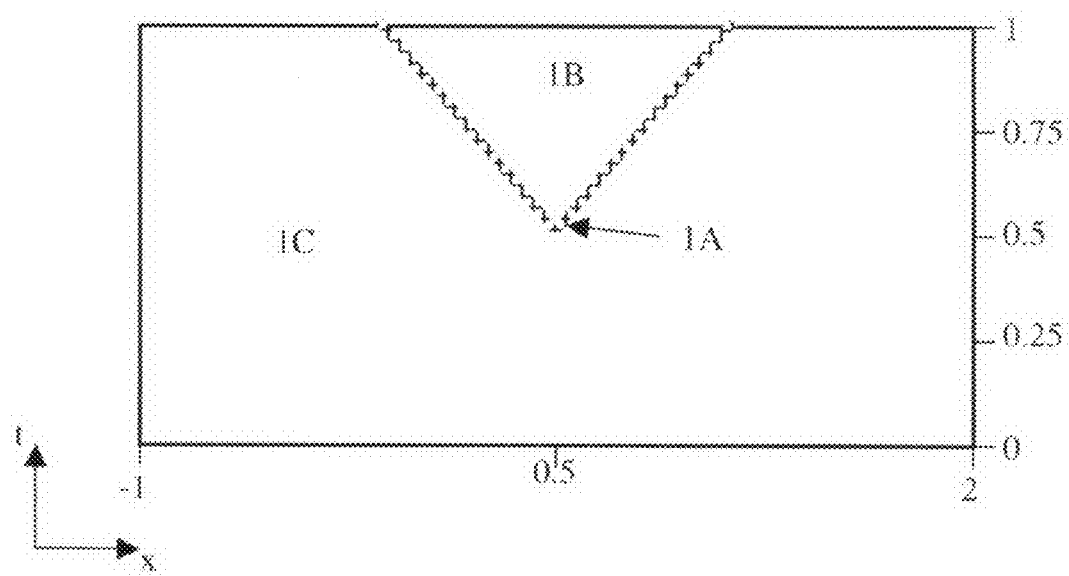
FIG. 1 is a plot showing the space-time solution domain of an idealized one-dimensional combustion problem.

This invention, referred to as the Space-Time Mapping Analysis (STMA) method and/or system, relates to an engineering method and/or system for modeling and/or designing and/or building complex physical processes, components, devices, and phenomena. STMA can be used in a way for modifying and/or improving the design of many different products, components, processes, and devices, for example, each of which is considered a "physical system." The term "physical system" includes anything and everything that could be physically implemented and/or designed and/or built by human beings or by human tools and machines, while the term "engineering system" may include any method, process, and/or means for designing, modeling, evaluating, implementing, and/or building the physical system. Thus, STMA is provided to be implemented as a part of such an engineering system.

The STMA system and/or method, using a space-time mapping technique, can be implemented in software on a personal programmable computer, workstation, supercomputer, dedicated purpose computer, computing device, or even on many computers in series or parallel, to improve over traditional analysis techniques.

As described hereinabove in the Background section, when solving unsteady partial differential or integral equations for the state variables of a physical process over a period of time, the currently used solution methods for these processes treat the time direction in a different way than the space directions. These methods march, or sweep, in the time direction from an initial time to a final time, solving for the state variables everywhere in the space volume at each step in the time direction. In other words, the unsteady solution is obtained by one sweep in the time direction through the total space-time volume.

There are good reasons why this has been the case. From a purely physical point of view, our physical reality is one sweep in the time direction through the entire space-time volume of our life. Physically, the time direction is one-way; events at a later time do not affect events that occurred at an earlier time. This is also true for a computational model of a physical process. If a computational grid is chosen such that there is a well-defined time direction for the grid, then the solution can be obtained by marching in time. To construct such a grid, the grid cells are defined such that each cell has one or more faces normal to the time direction, or by having grid lines that run in the time direction.

It is important to note that many current methods generate a two- or three-dimensional grid in space and then march this grid in time. This is equivalent to stacking these grids in the time direction, resulting in a three- or four-dimensional space-time grid with all grid cells having two faces that are normal to the time direction.

Sweeping the solution in the time direction allows the user to only store data at a few time levels, reducing data storage and obtaining a solution by only making one sweep through the space-time volume of interest.

However, this is efficient only if the physical process of interest has one time scale that is important to resolve throughout the entire space-time domain, as opposed to physical processes with both small and large time scales scattered through the space-time domain. Also, if the spatial domain is changing in a complex way as time evolves, the time-marching methods lose their efficiency.

In the new STMA method, the space and time directions are treated in an equivalent way. Thus, rather than solving a three-dimensional unsteady problem by sweeping in the time direction from an initial point in time to a final point in time, the problem is solved as a four-dimensional problem in space-time. This leap from three spatial dimensions and one time direction to four space-time dimensions is not intuitive, but has been made in the past. However, removing the restrictions on the grid that are required to allow time marching is less intuitive, and has not been done. By removing these restrictions, the grid cells may then be placed and oriented in any way, and, for example, a grid line may start by traveling in the positive time direction, turn to travel in the x-direction in space at a single time, and then curve to travel in the negative time direction.

While the STMA method initially appears to require, in some cases, both more computer storage and computer effort to solve an unsteady problem over art current as of the drafting of this disclosure, but that is true only for relatively simple unsteady problems. For more complex problems, the STMA method comes into its own, allowing grids for complex space-time volumes to be more easily generated and efficient, massively parallelizable methods to obtain the unsteady solution.

In the following development, unsteady partial differential equation solution techniques will be used as an example; the solution procedures for integral equations are similar, and this process applies equally to integral equation solution procedures.

The STMA is a system and/or method by which unsteady partial differential or integral equations can be discretely solved in a multi-dimensional volume of space and time, thereby modeling an unsteady physical process of interest.

In this solution method, instead of mapping the equations only in space, the equations are mapped in space and time equivalently. Thus, instead of each grid cell being required to have at least one face normal to the time axis, as is typically the case in contemporary analysis techniques, there is no such restriction on the orientation of the grid cells for the STMA method.

By removing the restrictions on the grid cell orientation, the grid points or cells can be distributed in such a way as to minimize the number of grid points or cells required to calculate an accurate solution in space-time. Thus, with the STMA method, the total computational work can typically be reduced because local clustering of the grid cells will not impact the global grid spacing.

The STMA method is also a straightforward way of accurately and efficiently calculating solutions of equations which have a large range of space and time scales. In current technology, typically, the smallest time scale that must be resolved determines the global time step used, and thus the total computational effort that must be expended to solve an equation. In the STMA process, grid points can be locally clustered in space and time to resolve the smallest scales where they are present in the space-time volume, which can, in many cases, greatly reduce the computational effort required to obtain a solution.

Also, the STMA method is a straightforward way to solve problems which have two or more zones where different unsteady governing equations must be solved. For example, the unsteady interaction between an airplane wing structure and the airflow can typically be more easily solved with the STMA process due to the ability to iteratively locate the interface in space and time as the solution of the two sets of governing equations converges.

The STMA process also allows for a straightforward means of generating grids about complex bodies which are changing in time. For example, generating the space-time grid for a moving rotor interacting with a stationary stator becomes straightforward when the problem is solved over the entire space-time volume. The STMA method thus removes the necessity for the interpolation that is needed between the moving and stationary grids typically used in the current state-of-the-art methods.

Some applications of the STMA method to determine the performance or efficiency of physical processes of physical systems, are described next. In each application, it is shown that the STMA method is a part of a design and/or engineering process in which a computational model of the physical process is constructed; in which the STMA method is a tool by which the complex physical processes of physical systems can be analyzed and improved. Examples of applications are:

A) Design and/or performance analysis of an internal combustion engine: Internal combustion engines such as gas turbine engines, two- or four-stroke reciprocating engines, Wankel or rotary engines, among others, are widely used. There are many performance metrics that are considered important for an internal combustion engine, such as power output, fuel efficiency, heat transfer to the structural parts of the engine, emissions, and noise.

In order to determine the performance of such an engine, it is first necessary to develop a mathematical model that can be applied to the engine. For example, if the emissions of the engine are to be calculated, the Navier-Stokes equations of flow can be used, with chemistry models added to account for the reaction of the air and fuel in the engine and exhaust. At this point, the flow volume of interest in the engine is identified, and the geometry of the engine is prescribed in space and time in order to allow a computational grid to be generated. Since the engine geometry is very complex, with moving pistons and valves which open and close in the case of a reciprocating engine or moving rotors which cover and uncover intake and exhaust ports in the case of a Wankel engine, or moving rotors and stationary stators in the case of a gas turbine engine, the grid generation is a very involved process which has a large effect on the accuracy of the final solution. If the combustion is also to be modeled, the grid should accurately resolve the changing fuel-air mixture, the combustion process including the initiation and propagation of the flame front, as well as the reacting chemical species in the exhaust. The Navier-Stokes equations are then discretized for solution on this grid, the solution procedure preferably being performed on a computer or collection of computers.

In the current state-of-the-art, the unsteady solution is typically determined by solving the equations on a grid in which each grid cell or element has at least one face that is normal to the time direction. This restriction affects the grid generation, the equation discretization, the solution procedure used, and the accuracy of the computational result for the emissions produced by the engine.

In the STMA method, in contrast, the grid is generated for the entire space-time volume of the engine, with no limitation on the orientation of the faces of the grid cells or the placement of the grid cells except the requirement that the grid represent the geometry of the engine in space-time. This allows the user the freedom to place grid cells to accurately and efficiently resolve the complex geometries and flows through the engine. At this point, the unsteady solution is determined using either a time-marching procedure or an iterative or direct solution method, depending on the grid type and discretization chosen. The solution that is thus obtained is then analyzed to determine the emissions that were generated from the engine, and when and where these emissions were generated during the combustion process in the engine. Once a computational model of the engine has been developed, studies can be conducted using this method to determine the effect of various parameters on the emissions. Some examples of such parameters are engine geometry, fuel/air ratio, and spark timing.

B) Design and/or performance analysis of a lubricated bearing: Lubricated bearings are an important part of many machines, and the study and design of lubricated bearings is a major area of research called tribology. There are two major types of lubricated bearings: plain or hydrostatic bearings and roller-element bearings. In a plain bearing, a pressurized film of lubricant keeps the rotating element from touching the stationary element; in a roller-element bearing, there are rolling elements such as needles or balls which roll between the stationary element and the rotating element. In this example, a roller-element bearing on the crankshaft of a motorcycle engine will be analyzed. The equations to be solved are both the Navier-Stokes equations for the oil flow through the bearing and the equations of structural motion for the behavior of the roller elements in the bearing. The Navier-Stokes equations will be modified to include a model to represent the effect of cavitation on the oil flow. The computational grid is divided into two major parts, one for the flow equations and another for the equations of structural motion. The space volume in which the flow equations are solved extends from the incoming oil gallery to the bearing, between the rotating and stationary elements, to the sides of the bearing, and to any outgoing oil galleries to the connecting rods. The space volume in which the structural equations are solved extends from the interior of the rotating element to the rotating bearing surface, from the interior of the stationary element to the stationary bearing surface, and in the interior of the roller elements in the bearing. In time, both domains extend through one or more cycles of rotation of the rotating element. The computational grid for this problem is very complex, due to the unknown motion of the roller elements in the bearing as well as the unknown areas of cavitation in the oil flow. Due to the unknown motion of the roller elements, which may encounter too much oil and 'skid' in the bearing, the grid must adapt in an unsteady manner to the behavior of the roller elements. Also, the bearing elements are not rigid; the deflection of the bearing elements must also be determined and accounted for in an unsteady manner.

The STMA method allows such a complex physical process, with the very complex geometry and interaction between flow and structural phenomena, to be calculated in a straightforward way. Once the physical process is modeled, the performance of the roller element bearing can be investigated and the effects of varying the parameters such as oil pressure, oil gallery placement, roller element shape and size, and the diameter of the bearing can be determined and the most efficient solution chosen.

C) Design and/or performance analysis of an artificial heart, kidney, or blood vessel: Artificial hearts, kidneys, and blood vessels are of interest to the medical community in order to reduce the need to transplant organs from donors, with the attendant problem of organ rejection. The performance of these devices are measured by their effectiveness in pumping blood, removing wastes from the blood, and in transporting the blood. Another measure of performance is the amount of damage that these devices cause to the blood and the body of the recipient patient.

In this example, the performance of an artificial heart is determined. In a blood flow, it is very important to minimize the shear stresses on the blood, which minimizes damage to the blood cells; thus, a computational model of the flow in the artificial heart will allow the shear stresses to be determined. The computational model will use the Navier-Stokes equations for a non-Newtonian flow, either with a model used to represent the effect of the blood cells or actually including the blood cells in the calculation. The space volume of the computational grid will extend from the blood vessel leading to the artificial heart through the heart itself to the blood vessel exiting from the artificial heart. Inside the heart, the unsteady pumping mechanism with its valves and other moving parts will be included in the space volume of the artificial grid. The grid volume extends in time through one or more pumping cycles. The STMA method allows the complex flow and geometry in the artificial heart to be gridded and solved in a straightforward way. Once the computational model is developed, the flow can be analyzed in depth and the effects of parameters such as heart valve size and pumping mechanism on the performance of the artificial heart can be determined. The information thus gained can be used to improve the design of the artificial heart.

D) Design and/or performance analysis of a manufacturing process for a VLSI chip: Chemical Vapor Deposition (CVD) is a process for depositing thin films of material on a substrate or deposition surface. This process is widely used for the fabrication of microelectronic devices such as a Very Large Scale Integrated (VLSI) circuit chip. In a typical CVD process, cold reactant gases enter a reaction chamber. The gas mixture is heated as it approaches the deposition surface, and slows in the viscous boundary layer near the substrate. Chemical reactions occur on the substrate, resulting in a deposition of material on the substrate surface. Gaseous products of the reaction then flow out of the chamber.

In this example, the performance of a CVD deposition method for the manufacture of a VLSI chip is determined. To build a computational model of this process, the process is divided into two major parts: the structure of the substrate and the reaction chamber, and the flow and chemical reactions which occur in the reaction chamber. The equations of structural dynamics are used to model the unsteady behavior of the substrate and reaction chamber, and either the Boltzmann equations or the Navier-Stokes equations are used to model the flow of the chemical species in the reaction chamber. A thermochemistry model is added to the flow equations to account for the chemical reactions that occur in the flow and on the substrate. The computational grid is split into two major parts; one for the structure, the other for the flow and chemistry.

The process is very complex, with chemical reactions occurring in an unsteady manner, and the deposition changing the geometry of the substrate in an unsteady manner. By treating the problem in a volume of space-time with the STMA method, the computational grid can be adapted as the problem is being solved to accurately represent the flow, the structural geometry, and the chemical reactions occurring during the CVD process. For the STMA method, the space volume of interest contains the substrate and reaction chamber as well as the inflow and outflow channels for the reaction chamber, while the time volume of interest extends from the time that the substrate is put in the reaction chamber to the end of the CVD process. Once the computational model of the process is completed, the effect of varying parameters such as reactive gas composition, flow velocity, pressure, temperature, substrate temperature, substrate geometry, and reactive chamber geometry on the efficiency and speed of the CVD process can be investigated, and the manufacturing process can be improved.

E) Design and/or performance analysis of a spray nozzle: Spray nozzles are used for many tasks such as injecting fuel into the intake manifolds or combustion chambers of internal combustion engines, spraying ink onto paper in an inkjet printer, or sprinkling water onto a fire in a room. Depending on the application, some examples of the desired performance of a spray nozzle may be the size of the droplets in the spray, the pattern of the spray, or the distance that the liquid is sprayed.

In this example, the flow of ink from an inkjet printer nozzle is to be determined. To construct a computational model of the flow from an inkjet printer nozzle, the problem is divided into two major parts: the liquid ink flow inside and outside of the nozzle, and the air flow that the liquid ink flow is passing through outside of the nozzle. While the Navier-Stokes equations of fluid motion are used to solve both the air and liquid ink flows, there is a computational boundary between the air and ink that requires the computational grid for both the air and the ink to track the evolution of the ink jet in space and time. Since the ink jet is dispersing into bubbles of ink that are in turn combining, dividing, and hitting the paper and splashing, the grid for this problem is both very complex and changing rapidly in time; thus, this problem is very difficult to solve with existing methods. In the STMA method, the grid for the ink jet treats the jet as a jet in space and time equivalently, allowing the evolution of the bubbles to be captured in a more straightforward way and the computational model to be easily designed and implemented. Once the computational model has been implemented, the performance of the inkjet spray nozzle can be determined, and the effect of changing parameters such as spray pressure, nozzle shape and diameter, and the distance of the nozzle from the paper surface can be determined. With this information, the nozzle design can be revised to improve performance.

The attached drawings illustrate the use of the STMA technique for various example problems. It will be understood that these examples are given for illustration only, and that the STMA process can be used for many different applications and can be implemented in many different manners, all within the scope of this disclosure.

In FIG. 1, a one-dimensional unsteady combustion problem is shown. The space direction, ranging one foot in each direction, is represented by x, and the time coordinate, ranging from 0 to 1 seconds, by t. Initially, at time=0, the domain is filled with premixed fuel and air, as shown in zone 1C. At time=0.5 second, a spark occurs at point 1A, causing a flame front to spread rapidly in each direction. This flame front is shown by the hatched lines. Behind the flame front, where combustion has occurred, the combustion products remain in zone 1B.

Figure 2:
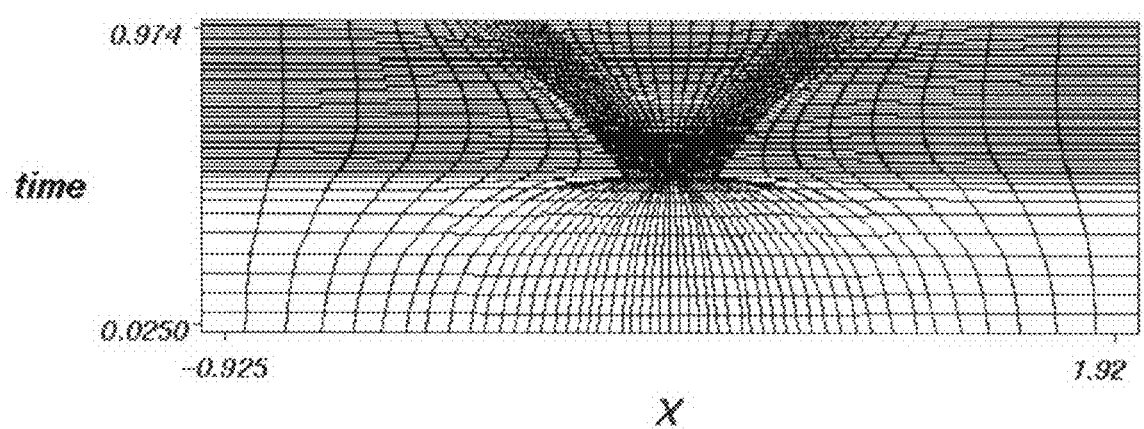
FIG. 2 is a plot showing the type of grid used to currently solve a one-dimensional combustion problem.

This can be a very difficult problem to calculate, due to the extreme thinness of the flame front and its high rate of travel. FIG. 2 shows a known state of the art grid for computing a problem of this type, as of the writing of this disclosure. In FIG. 2, the solution is obtained by one sweep through the grid, marching in the time direction. In FIG. 2, the spatial grid points are moved to resolve the flame front as time progresses; however, the rapidity of the combustion process requires very small time steps to be taken, illustrated by the large number of closely spaced time levels in FIG. 2. Thus, even though there is not much change in the flow away from the flame front, all spatial points must be marched at the small time step that is required near the flame front. This typically requires heavy computing resources to obtain a numerical solution.

Figure 3:
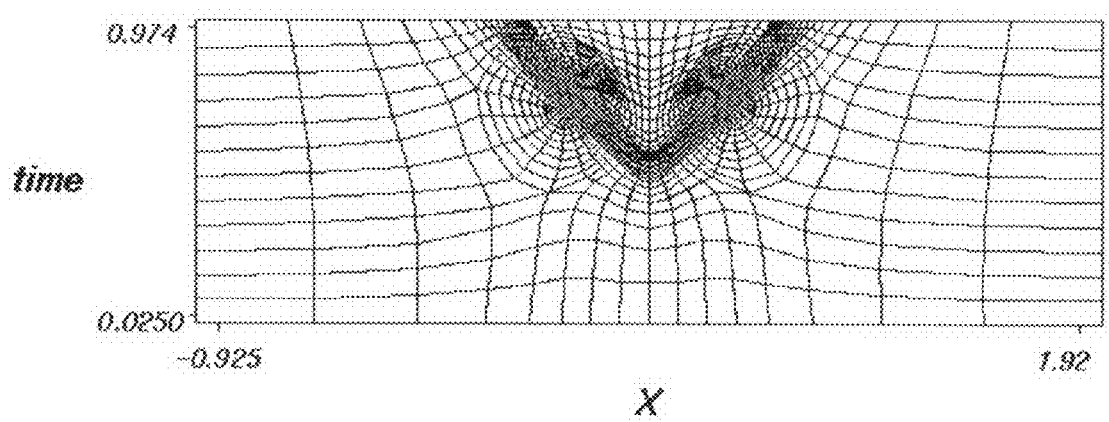
FIG. 3 is a plot showing the type of grid that can be used with the described process to solve a one-dimensional combustion problem.

FIG. 3 shows an example grid that could be used by a STMA solution procedure. In FIG. 3, the solution is obtained by iteratively or directly solving the entire space-time volume simultaneously. Note that, unlike the grid shown in FIG. 2, the grid cells have no restrictions placed on their space-time orientation. By mapping the entire space-time domain, a much more efficient use of grid points is shown, with an accompanying reduction in the computational effort required. Also, because grid points are clustered in space-time only in regions of interest, an accurate solution can be more easily obtained as compared to the typical approach.

The STMA process can be used with either structured or unstructured grids in any number of spatial dimensions. To illustrate this process, a curvilinear mapping method for a structured grid in two spatial dimensions (x and y) will be described.

First, the equations are mapped into generalized curvilinear coordinates $(\xi,\eta,\tau)$ using this transformation:

$$\xi=\xi(x,y,t)$$

$$\eta=\eta(x,y,t)$$

$$\tau=\tau(x,y,t) \quad \text{(EQ14)}$$

Using the chain rule for derivatives, EQ1 can be rewritten as:

$$\frac{\partial Q}{\partial \tau}\frac{\partial \tau}{\partial t} + \frac{\partial Q}{\partial \xi}\frac{\partial \xi}{\partial t} + \frac{\partial Q}{\partial \eta}\frac{\partial \eta}{\partial t} + \quad \text{(EQ 15)}$$

-continued $$\frac{\partial F}{\partial \tau}\frac{\partial \tau}{\partial x} + \frac{\partial F}{\partial \xi}\frac{\partial \xi}{\partial x} + \frac{\partial F}{\partial \eta}\frac{\partial \eta}{\partial x} +$$

$$\frac{\partial G}{\partial \tau}\frac{\partial \tau}{\partial y} + \frac{\partial G}{\partial \xi}\frac{\partial \xi}{\partial y} + \frac{\partial G}{\partial \eta}\frac{\partial \eta}{\partial y} = S$$

EQ15 can be transformed into strongly conservative form to retain the conservative numerical properties of the original equation:

$$\frac{\partial}{\partial \tau}\left(\frac{\partial \tau}{\partial t}\frac{Q}{J} + \frac{\partial \tau}{\partial x}\frac{F}{J} + \frac{\partial \tau}{\partial y}\frac{G}{J}\right) + \quad \text{(EQ 16)}$$

$$\frac{\partial}{\partial \xi}\left(\frac{\partial \xi}{\partial t}\frac{Q}{J} + \frac{\partial \xi}{\partial x}\frac{F}{J} + \frac{\partial \xi}{\partial y}\frac{G}{J}\right) +$$

$$\frac{\partial}{\partial \eta}\left(\frac{\partial \eta}{\partial t}\frac{Q}{J} + \frac{\partial \eta}{\partial x}\frac{F}{J} + \frac{\partial \eta}{\partial y}\frac{G}{J}\right) = \frac{S}{J}$$

where J is the Jacobian of the space-time transformation, and is dependent on the space-time grid metrics.

It is important to note that, unlike the existing transformation given in EQ10, none of the transformed coordinates $(\xi,\eta,\tau)$ in the STMA method are associated directly with any of the physical coordinates (x,y,t). Because of this, the numerical scheme should allow information to propagate in both directions for each transformed coordinate. One way to accomplish this (but not the only way) is to use at least second-order differences for all coordinate directions. For example:

$$\left.\frac{\partial Q}{\partial \tau}\right|_{i,j,n} = \frac{Q_{i,j,n+1} - Q_{i,j,n-1}}{2\Delta\tau} \quad \text{(EQ 17)}$$

$$\left.\frac{\partial F}{\partial \xi}\right|_{i,j,n} = \frac{F_{i+1,j,n} - F_{i-1,j,n}}{2\Delta\xi}$$

$$\left.\frac{\partial G}{\partial \eta}\right|_{i,j,n} = \frac{G_{i,j+1,n} - G_{i,j-1,n}}{2\Delta\eta}$$

Here again, the i index is now associated with the $\xi$ direction, and the j index with the $\eta$ direction. However, the n index is now associated explicitly with the $\tau$ direction, which does not necessarily lie in the physical time direction.

EQ16 can either be solved directly or through an iterative process. An example of an iterative process for EQ16 is:

$$\left.\frac{Q}{J}\right|^{l+1}_{i,j,n} = \left.\frac{Q}{J}\right|^{l}_{i,j,n} + \omega \begin{bmatrix} \frac{S}{J} \\ -\frac{\partial}{\partial \tau}\left(\frac{\partial \tau}{\partial t}\frac{Q}{J} + \frac{\partial \tau}{\partial x}\frac{F}{J} + \frac{\partial \tau}{\partial y}\frac{G}{J}\right) \\ -\frac{\partial}{\partial \xi}\left(\frac{\partial \xi}{\partial t}\frac{Q}{J} + \frac{\partial \xi}{\partial x}\frac{F}{J} + \frac{\partial \xi}{\partial y}\frac{G}{J}\right) \\ -\frac{\partial}{\partial \eta}\left(\frac{\partial \eta}{\partial t}\frac{Q}{J} + \frac{\partial \eta}{\partial x}\frac{F}{J} + \frac{\partial \eta}{\partial y}\frac{G}{J}\right) \end{bmatrix}^{l}_{i,j,n} \quad \text{(EQ 18)}$$

Notice the difference in EQ18 and EQ13. In EQ13, the iteration is performed at each time level, to advance the spatial solution in time. In EQ18, the entire space-time solution is being iterated upon; when the iteration converges, the entire space-time solution will be known. If the entire space-time domain is too large to be solved at once, the problem can be decomposed into space-time "blocks" or "domains", and solved in sequence or in parallel.

Note that the STMA process is not restricted to finite differencing methods with curvilinear coordinate transformations. Some examples (but not all) of other methods that this process can be used with are structured or unstructured grid solvers, using finite volume, finite element, spectral, lattice-gas, Direct Simulation Monte Carlo, and spectral element solution methods.

The new STMA approach has many differences compared to the existing state-of-the-art approach. Some of the differences that can be found are:

a) First, the grid generation process can be much more flexible than the existing methods. Because there is no restriction on the orientation of the grid lines or computational cells, grids can be generated about moving and stationary bodies with relative ease. In particular, unstructured or multiblock structured grid generators can be easily used. For the jet engine bypass flow example given above, the grid about the rotating fan blades will only be rotating with the fan blades on the surface of the fan blades. As the grid moves away from the rotating fan blades, the rate of rotation will diminish until the grid points are stationary on the stationary blades and the sliding interfaces will thus be removed from the problem. In this way, the STMA solution can be made much more accurate than the typical state-of-the-art solution.

b) Second, the STMA solution procedure can be made much more parallelizable than typical time-marching techniques. Because the problem now spans the entire space-time domain rather than just the space domain, the volume of cells that can be allocated to each computer processor is much greater, with well-defined surface communication patches.

c) Third, the STMA grid can be locally clustered in time, as well as in space, to resolve rapidly-changing flow phenomena without affecting the global resolution. In this way, the STMA grid in the turbulent boundary layer of a duct can be clustered in space and time to resolve the rapidly changing flow conditions there, while the STMA grid in the center of the duct can have much larger spacing in space and time because the flow is only changing slowly.

d) Finally, the space-time grid for the STMA method can be dynamically adjusted to increase the accuracy of the computed solution. Because the STMA method is solving the problem in space and time (space-time), the solver can use grid adaptation to place more grid points in areas of rapid change or to move grid points from regions of slow change to regions of rapid change. In this way, using the example of the fighter aircraft in dynamic stall, the STMA solver could find the time and place where the initial separation bubble is forming as the STMA solution is being calculated, and thus place more grid points in that area. This can give a much more accurate solution than the current state-of-the-art codes, which would typically require the user to rerun the entire problem and refine the grid spacing and time step in the region of the initial separation bubble until an accurate solution is obtained.

Figure 4:
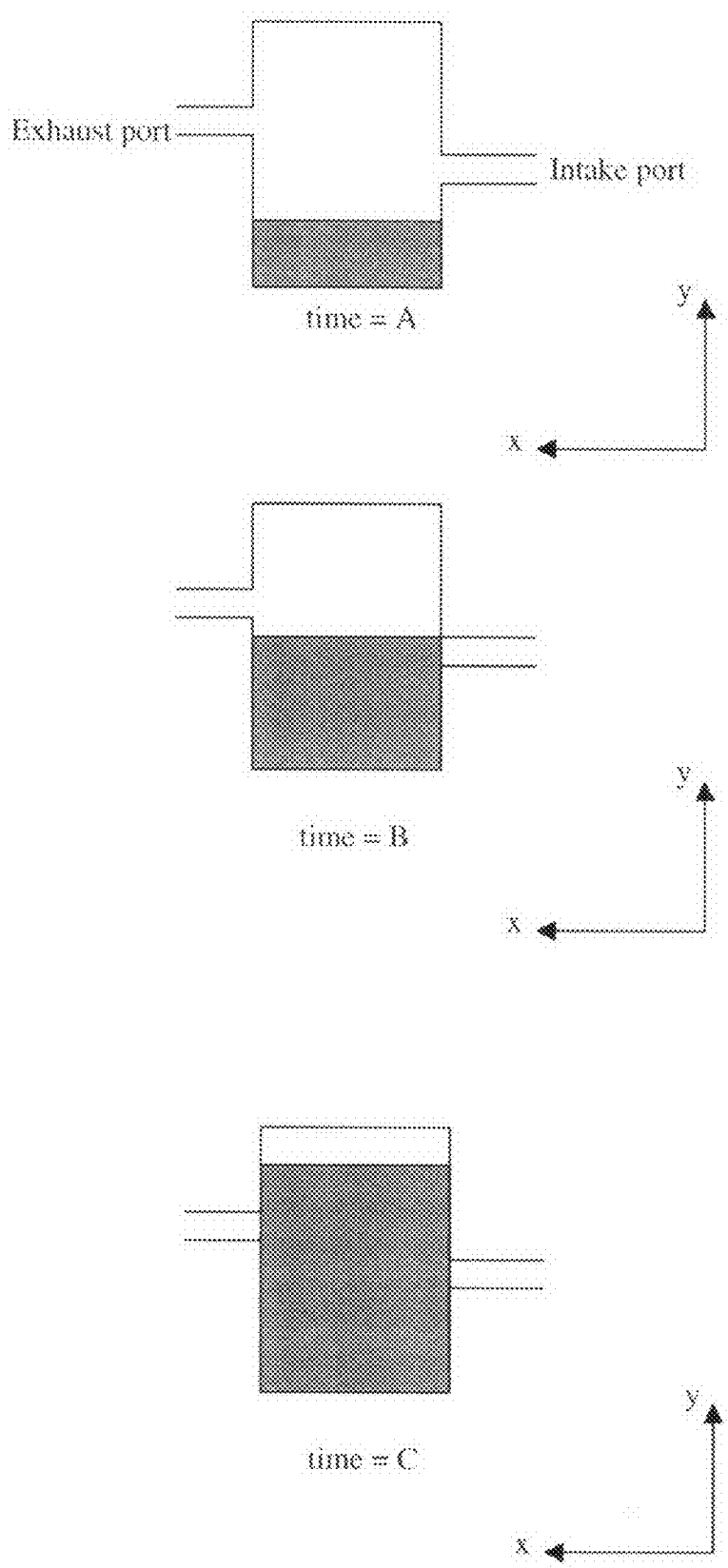
FIG. 4 is a simplified diagram showing an example of the geometry of a two-dimensional model of a two-stroke piston engine at several points in the cycle.

The next example shown is the calculation of flow through a two-dimensional model of a two-stroke internal combustion engine. In FIG. 4, the basic engine cycle is shown for a piston-port engine. At time=A, the piston is at the bottom of the stroke, and the intake and exhaust ports are open. As the piston moves up, the intake port is covered at time=B. The piston continues rising, covering the exhaust port and reaching the top of its stroke at time=C. At this point, the spark initiates combustion, and the piston is driven downwards, opening the exhaust port and then the intake port before the cycle begins again at point A.

To solve this problem with the existing technology, a minimum of three grid blocks are required; one in the intake port, one in the cylinder, and one in the exhaust port. The grid block in the cylinder moves with the piston, requiring an interpolation process to be used in order for the grid blocks located in the intake and exhaust ports to communicate with the grid block located in the cylinder when the ports are uncovered by the piston. Also, to fully calculate the dynamics of the flow, the structural equations for the piston, connecting rod, and crankshaft should be solved simultaneously to obtain the actual motion of the piston, connecting rod, and crankshaft.

Figure 5:
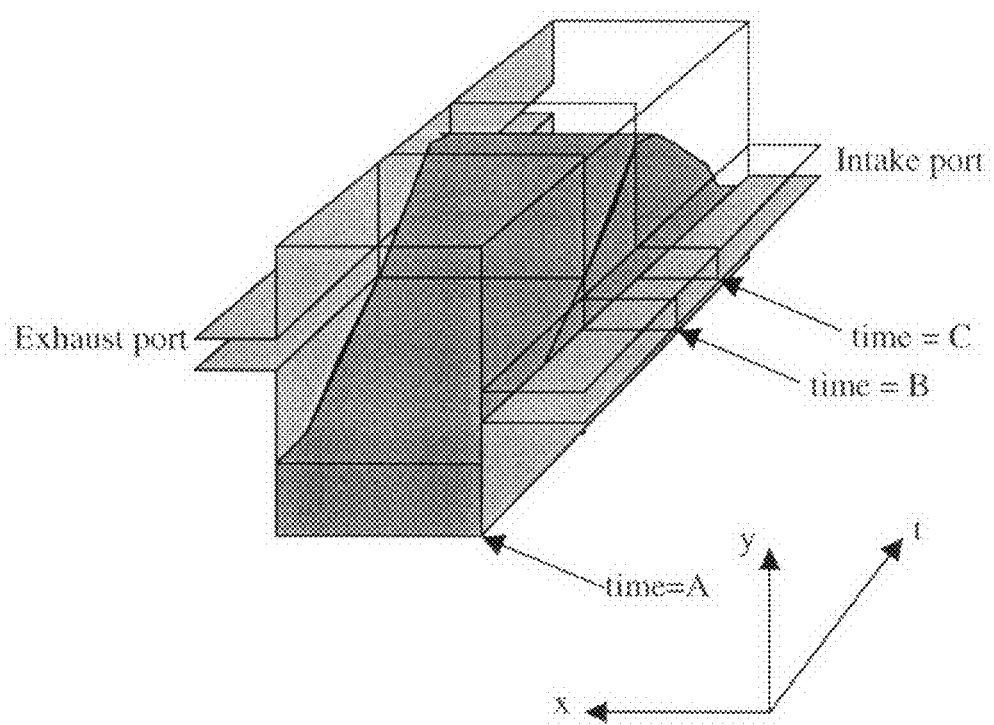
FIG. 5 is a diagram showing the space-time volume associated with the entire cycle of the two-dimensional model of a two-stroke piston engine of the geometry shown in FIG. 4.

FIG. 5 shows the space-time volume that would be solved using the STMA method. The rise and fall of the piston through the cycle can be seen, as well as the opening and closing of the intake and exhaust ports. However, now the volume can be mapped directly in space-time, removing the need for the interpolation process between the ports and the cylinder. Also, because the cycle is repeating every time the piston rises and falls, the problem can be solved in a periodic manner, allowing the grid to communicate from the time outflow boundary to the time inflow boundary. This allows the solution to be obtained in a relatively fast and efficient manner. If the structural equations are calculated also, the grid can be dynamically moved between iterations to account for the improved solution for the piston motion. This allows the interaction of the structural and flow equations to be accurately calculated as well allowing the limit cycle to be obtained quickly.

Figure 6:
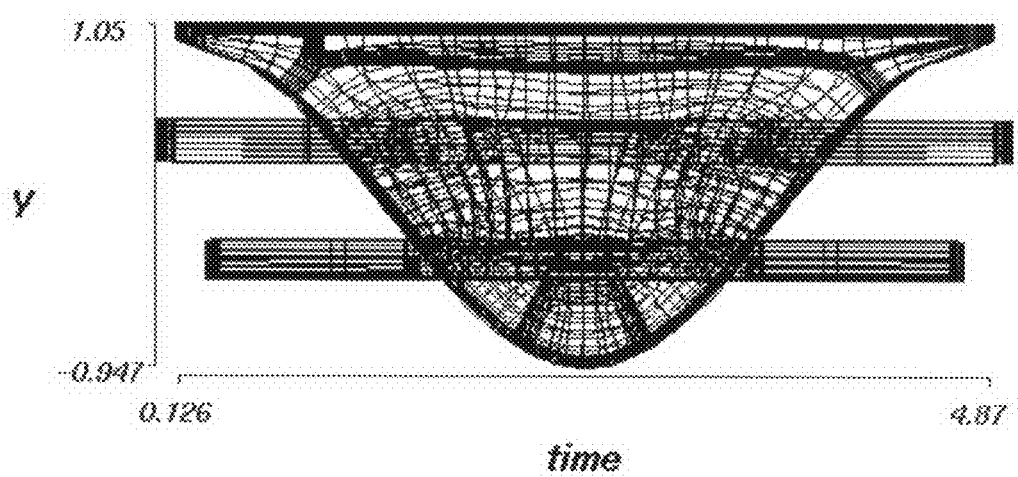
FIGS. 6, 7, and 8 show a space-time mapped grid generated for the solution of an entire cycle of the two-dimensional model of a two-stroke piston engine of the geometry shown in FIG. 4.
Figure 7:
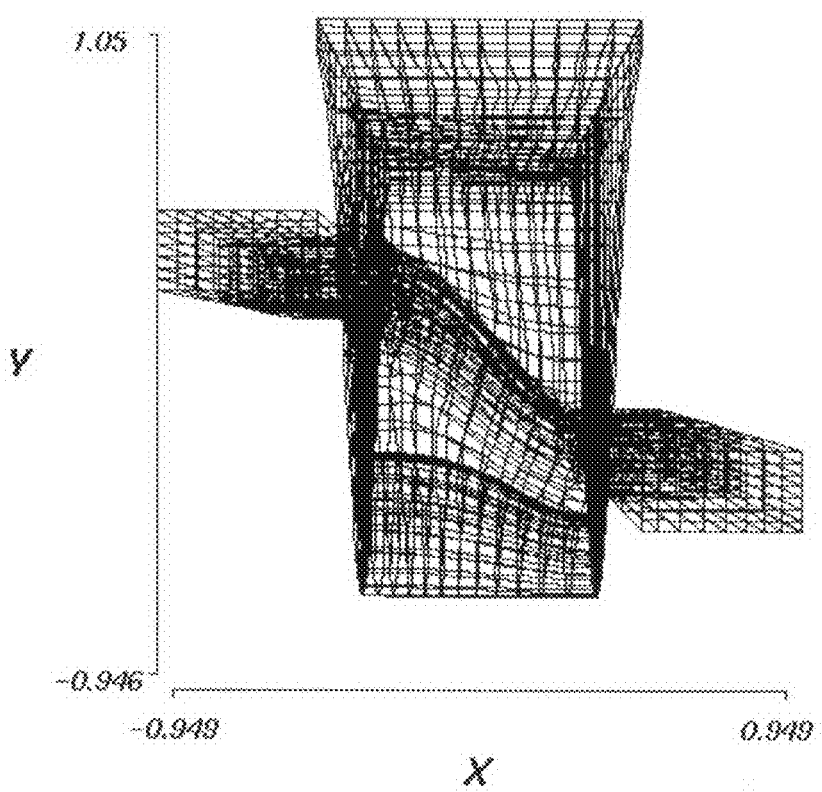
Figure 8:
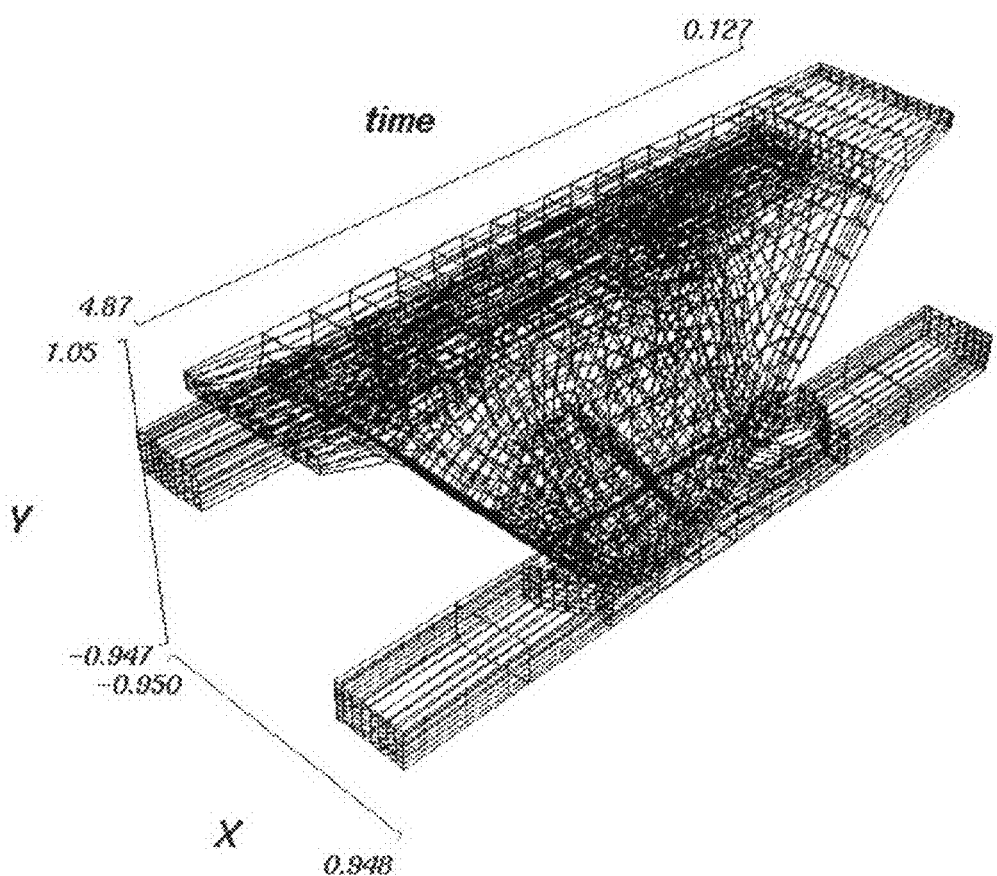

FIGS. 6, 7, and 8 show three views of an actual STMA grid generated to solve the flow in the domain shown in FIG. 4. In FIGS. 6, 7, and 8, the periodic domain begins at the piston's highest point and continues through one cycle of piston motion; since the problem is periodic, this temporal shift of the initial point as compared to FIG. 5 does not affect the solution; this shift made the topology simpler for the grid generator.

In FIG. 6, the side view of the grid is shown, looking from the x coordinate direction. In this view, the intake and exhaust ports are the rectangular structures, and the cylinder head is the uppermost flat surface plane. The smoothly curved surface is the piston. It can be seen in this view that the grid cells do not have faces normal to the time direction; in fact, some grid lines change from traveling in the positive time direction to traveling in the negative time direction. This is the type of grid that the STMA method is designed to allow.

In FIG. 7, the front view of the grid is shown, looking in the time direction. The rectangular structure on the left is the exhaust port, while the similar structure on the right is the intake port.

FIG. 8 shows an isometric view of the same grid. In this view, the freedom that the STMA method allows for the grid is evident. Notice that the grid lines that define the closed wall of the intake port (while the piston is covering the port) enter the cylinder at the time of intake port opening and then curve around in both space and time to define the cylinder wall. This illustrates the relative ease with which an STMA grid can be generated for this very complex problem.

In FIGS. 6, 7, and 8, note that the grid cells have no preferred orientation in space and time; this is what allows the STMA grid to be generated easily for this topology.

Figure 9:
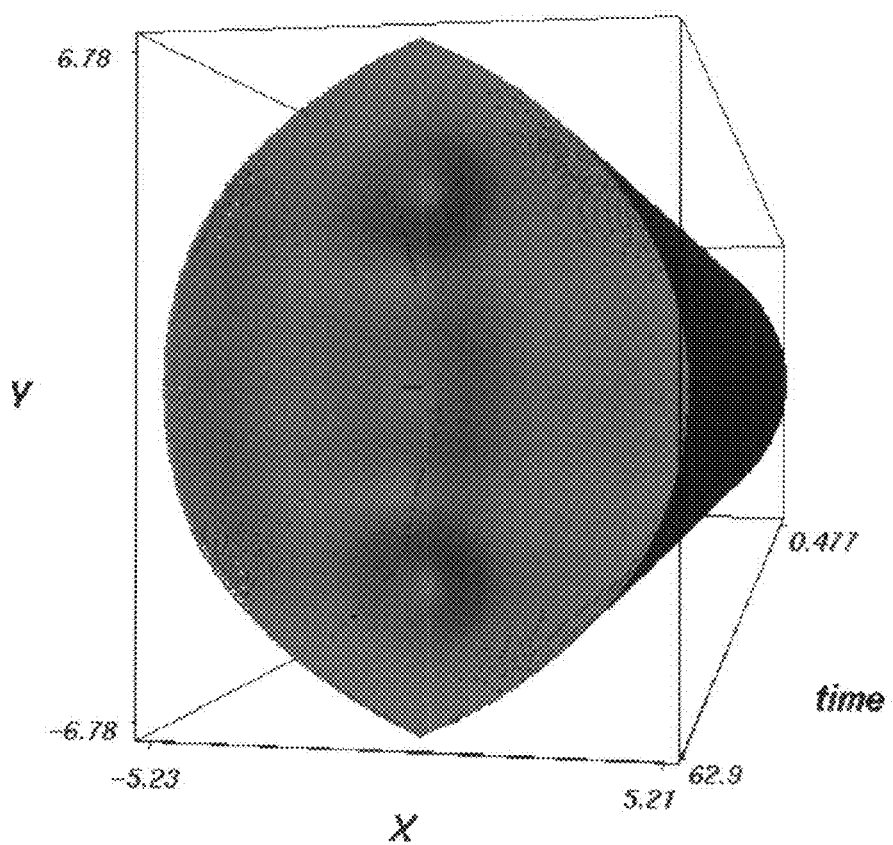
FIG. 9 is a diagram showing an example of a space-time grid used to solve for the unsteady flow about a two-dimensional symmetric 12% thick Joukowski airfoil.

An example application of the STMA process is shown in FIGS. 9-16. The example solution is the space-time calculation of unsteady flow which occurs when a simple-harmonic vortical gust impacts a 12% thick symmetric Joukowski airfoil at zero angle of attack in a Mach=0.5 mean flow. This benchmark problem models the flow and noise generated in a jet aircraft engine when turbulent wakes from a spinning rotor upstream convect downstream and impact a stationary stator. The grid used for the STMA method is varying in space and time, using 426×148×11 grid points, for a total of 693,528 points in the space-time volume. This grid is shown in FIG. 9. The solution procedure uses a sixth-order finite differencing scheme in all directions. The boundary conditions used are the acoustic radiation inflow, and the outflow condition of Tam and Webb (1993) (Tam C. K. W. and Webb, J.C. (1993) 'Dispersion-Relation-Preserving Finite-Difference Schemes for Computational Acoustics', *Journal of Computational Physics, Vol.* 107, 1993, p. 262-281). In the temporal direction, a periodic boundary is used.

The solution procedure used was iterative. The initial guess for the STMA solution was a vortical gust superposed on a uniform mean flow. The velocities due to the vortical gust are defined as:

$$u_{gust} = -\left(\frac{\varepsilon\beta M}{\sqrt{\alpha^2+\beta^2}}\right)\cos(\alpha x + \beta y - \omega t) \quad (EQ\ 19)$$

$$v_{gust} = \left(\frac{\varepsilon\alpha M}{\sqrt{\alpha^2+\beta^2}}\right)\cos(\alpha x + \beta y - \omega t)$$

where:

$\alpha=2k$ $\beta=2k$ $\omega=2kM$ (EQ20)

In this test case:

$k=0.1$ $\varepsilon=0.02$ (EQ21)

This problem is a model problem for the flow and noise in a jet bypass flow, where turbulent wakes from the fan blades are convected downstream to hit the stationary stator blades. In this problem, the vortical gusts represent the turbulent wakes from the upstream fan blades, and the airfoil represents the stationary stator blade.

An explicit Runge-Kutta scheme was used to iterate the solution from the initial solution to the converged solution.

Figure 10:
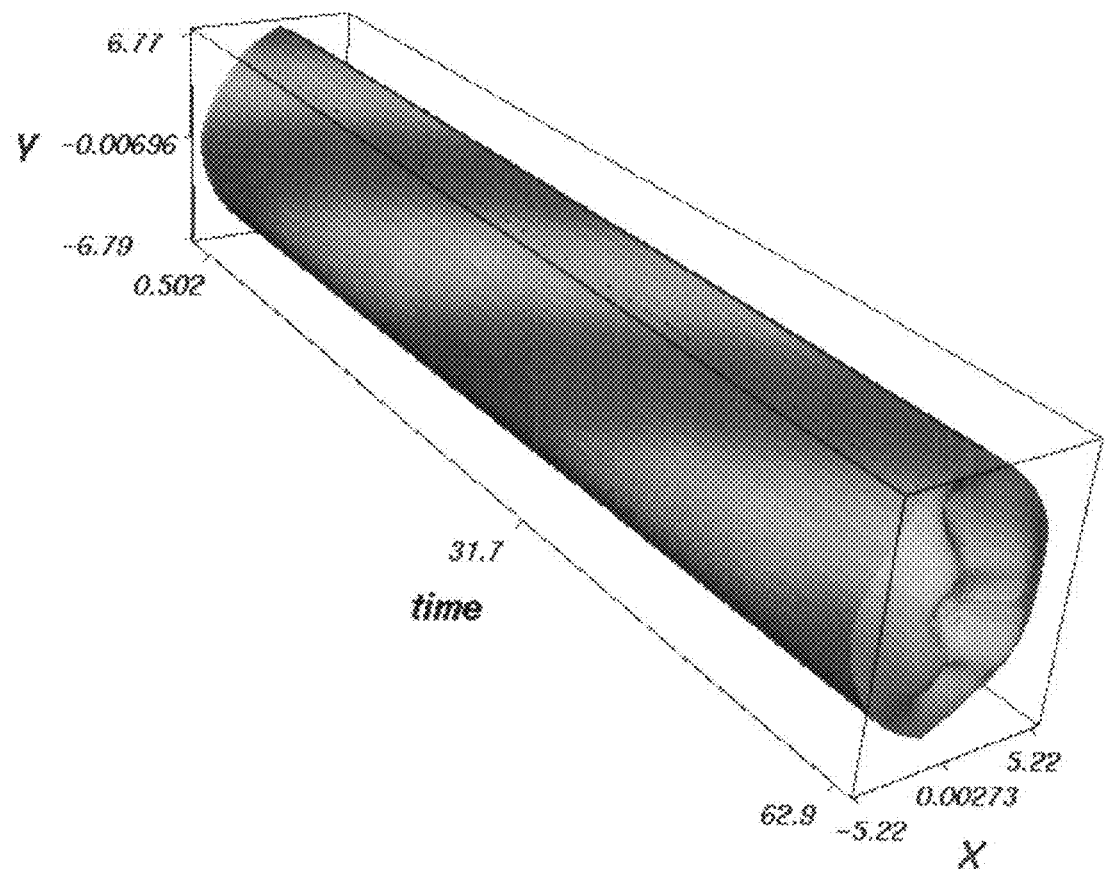
FIG. 10 is a plot showing the computed magnitude of the perturbation velocity on the boundaries of the space-time solution domain for the unsteady flow about a two-dimensional symmetric 12% thick Joukowski airfoil impacting a simple-harmonic vortical gust.

FIG. 10 shows the converged STMA results for the magnitude of the velocity perturbations from the mean, or average, velocities. The incoming vortical gust is seen as a series of bands across the inflow boundary of the grid.

Figure 11:
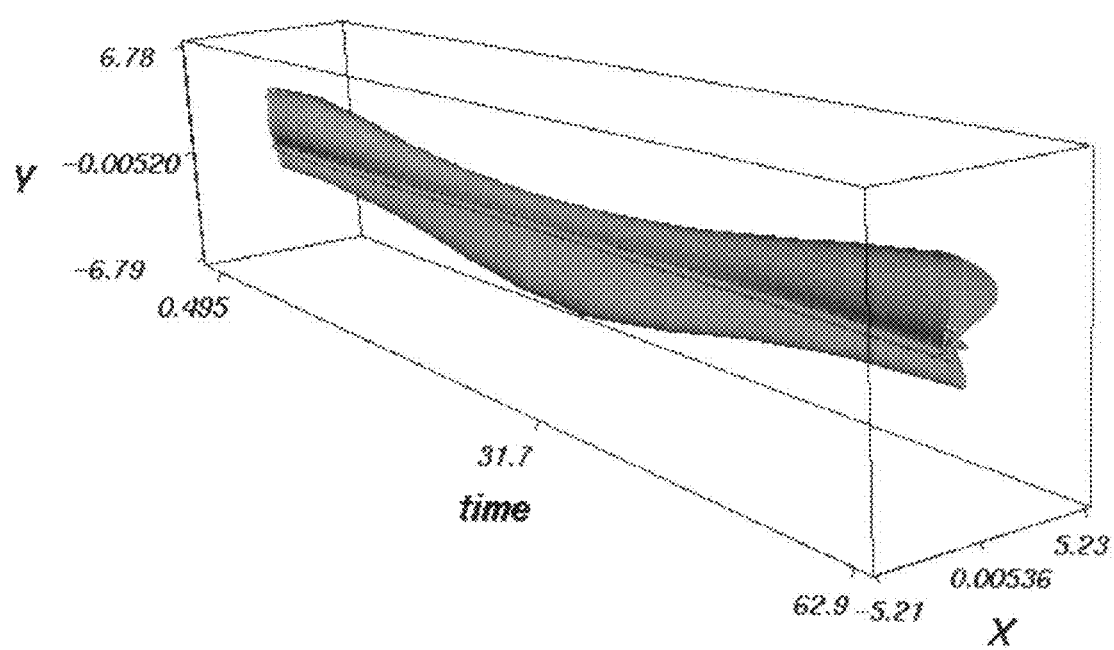
FIG. 11 is a plot showing the computed isosurfaces of density for the unsteady flow about a two-dimensional symmetric 12% thick Joukowski airfoil impacting a simple-harmonic vortical gust.

FIG. 11 shows the space-time contours of the converged solution for the density. As the upwash and downwash from the vortical gust impacts the airfoil; it changes the pressure distribution on the airfoil surface, causing a lifting force which is alternately up and down on the airfoil. This process is illustrated in the contours of density shown in FIG. 11.

Figure 12:
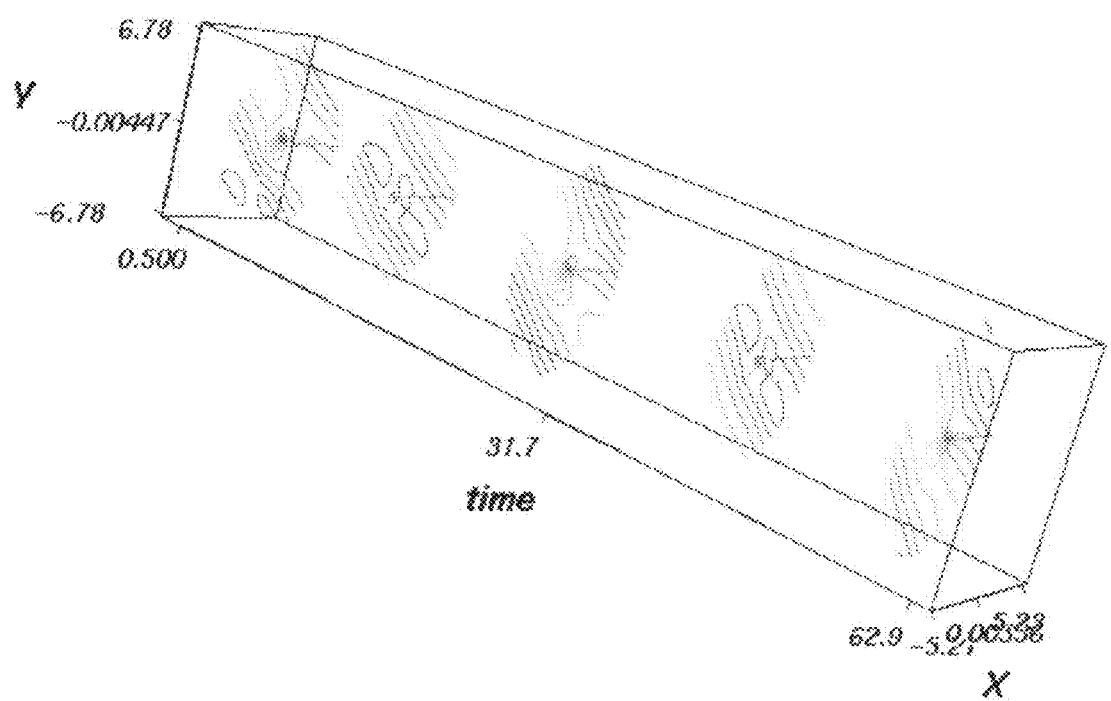
FIG. 12 is a plot showing the computed contours of the magnitude of the perturbation velocity at various time planes of the space-time solution domain for the unsteady flow about a two-dimensional symmetric 12% thick Joukowski airfoil impacting a simple-harmonic vortical gust.

FIG. 12 shows the converged result for the unsteady perturbation velocity magnitude at several time levels in the STMA space-time volume. The velocities due to the vortical gust can be seen entering from the left of the grid and convecting in the x-direction. As it nears the airfoil, the nonuniform flow around the airfoil distorts the gust as it breaks in two to go around the airfoil. Downstream of the airfoil, the gust reforms, with a reduced amplitude directly downstream of the airfoil.

Figure 13:
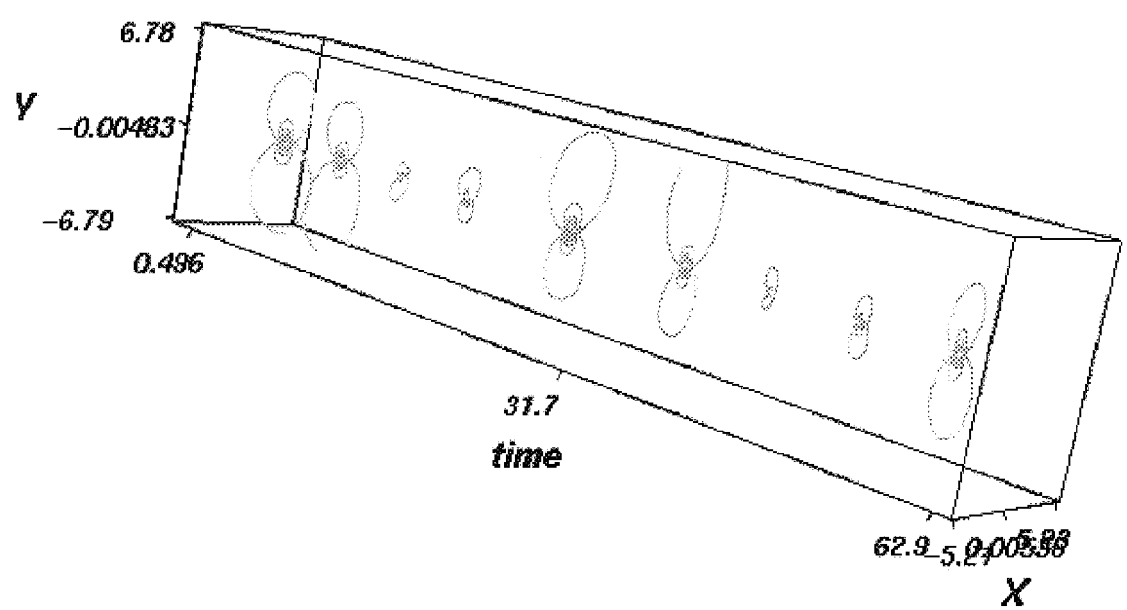
FIG. 13 is a plot showing the computed contours of the perturbation density at various time planes of the space-time solution domain for the unsteady flow about a two-dimensional symmetric 12% thick Joukowski airfoil impacting a simple-harmonic vortical gust.

FIG. 13 shows the converged result for the unsteady perturbation density at several time levels in the space-time volume. In this figure, acoustic waves are generated when the vortical gust impacts the solid wall of the airfoil, and propagate away to the far field. This application shows the ability of the STMA process to accurately capture small perturbations propagating in a nonlinear unsteady flow through a grid that is mapped in both space and time.

Figure 14:
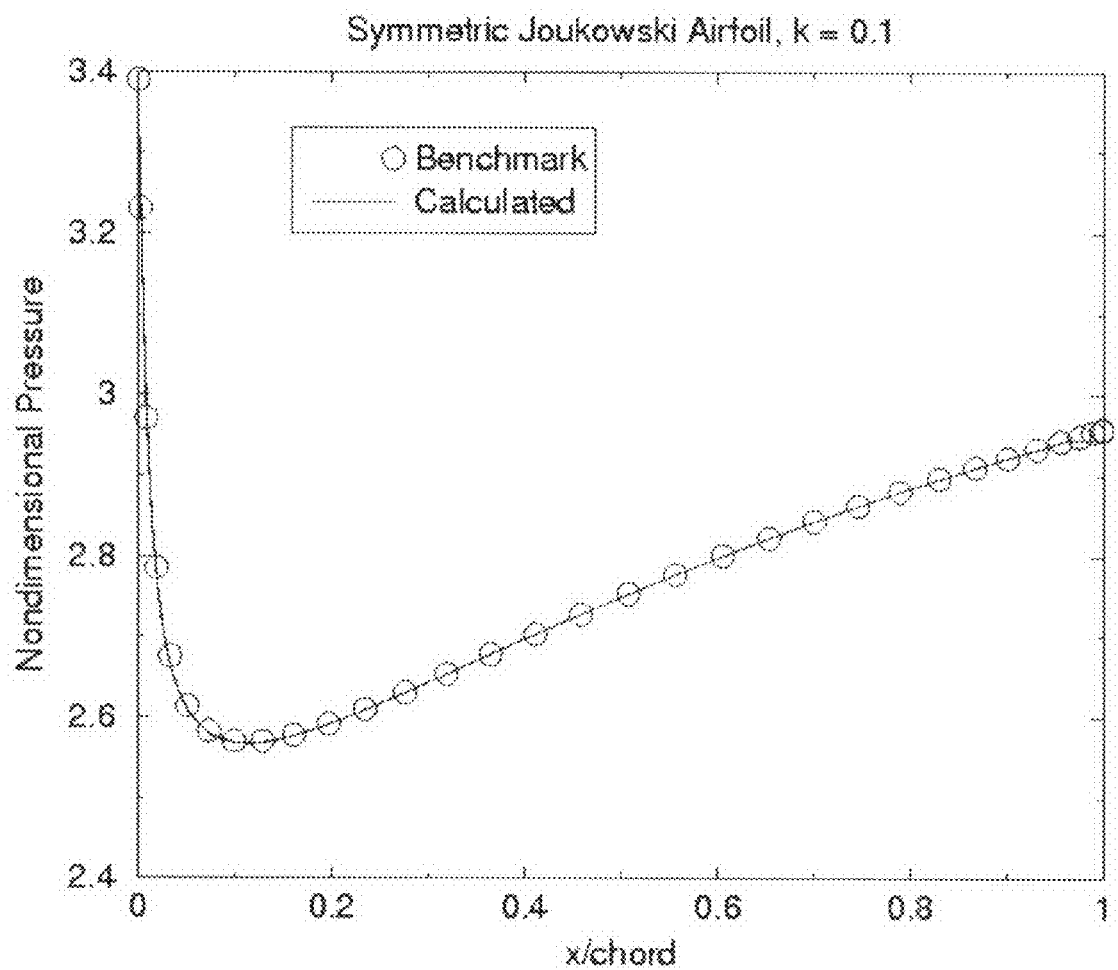
FIG. 14 is a plot showing a comparison of the computed mean pressure on the airfoil surface of a two-dimensional symmetric 12% thick Joukowski airfoil impacting a simple-harmonic vortical gust with that of a previously published benchmark solution.
Figure 15:
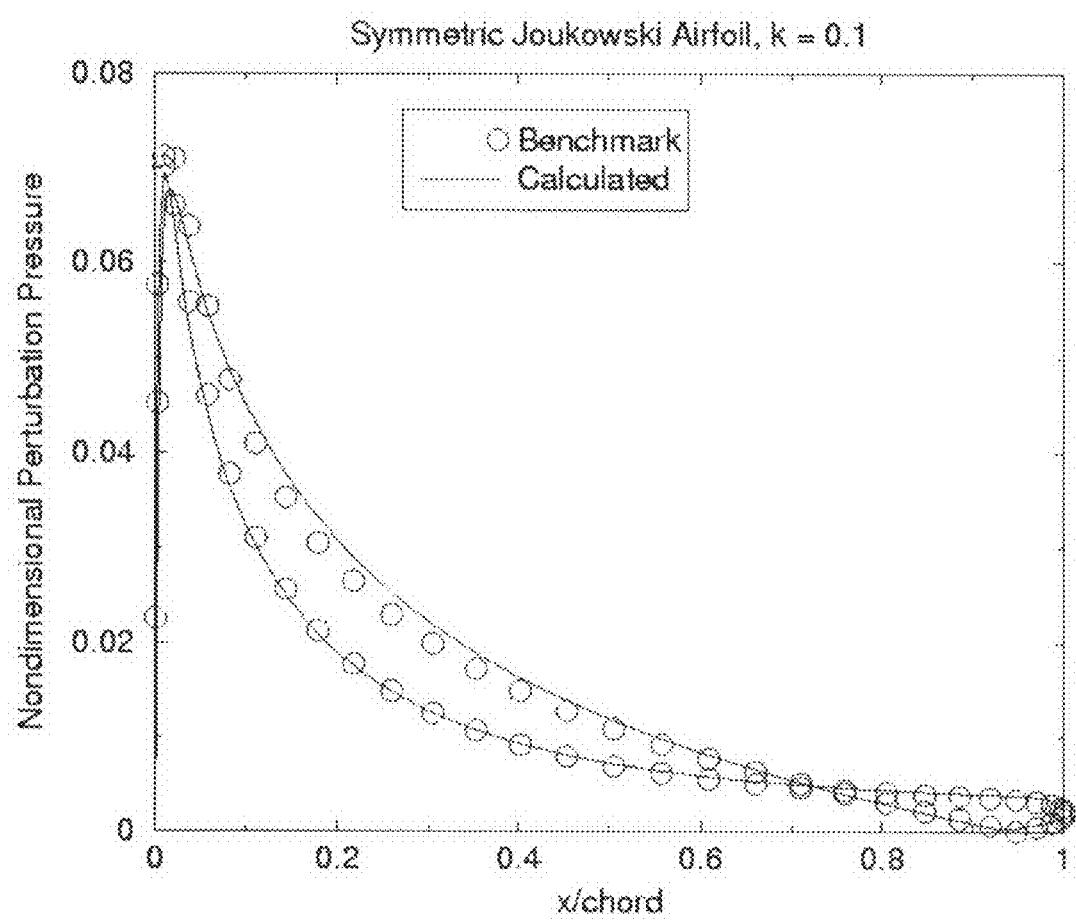
FIG. 15 is a plot showing a comparison of the computed root-mean-square of the pressure perturbation on the airfoil surface of a two-dimensional symmetric 12% thick Joukowski airfoil impacting a simple-harmonic vortical gust with that of a previously published benchmark solution.
Figure 16:
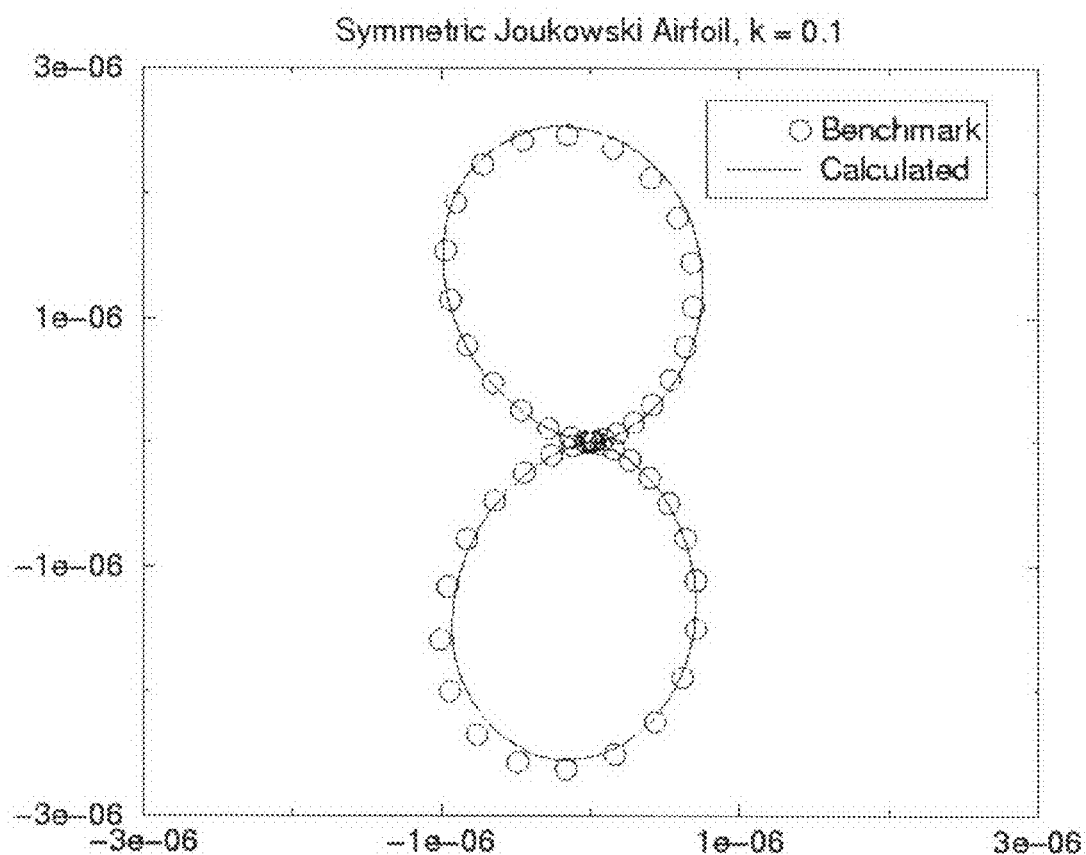
FIG. 16 is a plot showing a comparison of the computed acoustic intensity at a radius of four airfoil chordlengths from the midpoint of a two-dimensional symmetric 12% thick Joukowski airfoil impacting a simple-harmonic vortical gust with that of a previously published benchmark solution.

FIGS. 14, 15, and 16 compare the results of this code to a previously published Computational Aeroacoustics Benchmark solution given in Scott (2000) (Scott (2000) 'Category 3, Problem 1: Single Airfoil Gust Response Problem', *Third CAA Workshop on Benchmark Problems*, NASA/CP-2000-209790, pp. 47-59).

In FIG. 14, the mean, or average, pressure on the airfoil is compared to the benchmark solution, showing very good agreement.

In FIG. 15, the root mean square (RMS) perturbation pressure distribution on the airfoil surface is compared to the benchmark result. The new STMA approach is accurately capturing the distribution of the RMS pressure on the upper and lower surfaces of the airfoil. Note that, due to the two-dimensional nature of the gust, the upper and lower surface RMS perturbation pressure distributions are different.

In FIG. 16, the acoustic intensity on a circle of four airfoil chords in radius, centered on the airfoil, is compared to the benchmark solution. The STMA solution is very comparable to that of the benchmark solution. The ability of the new approach to accurately calculate the mean flow, the convection of the vortical gust to the airfoil, its interaction with the airfoil, and the generation and propagation of the sound waves are all demonstrated in this test case.

The steps used to apply the STMA method to this example application are described hereinbelow. This particular implementation of the STMA method is given as an example only; there are many ways to implement the STMA method, including within an engineering process.

First, the unsteady partial differential equations that describe the flow of a compressible fluid (in this case, air) are chosen. These equations are the Navier-Stokes equations.

Since the geometry of the Joukowski airfoil is designed to keep the airflow attached to the airfoil to reduce drag, and the airfoil is at a small angle of attack with respect to the oncoming air, the effects of viscosity are small. Thus, to save computer time, the viscous terms of the Navier-Stokes equations are neglected, leaving the inviscid Euler equations as the unsteady partial differential equations that describe the airflow of interest. These equations are given in EQ2.

Next, a method must be chosen to discretize the equations for solution. In this case, a structured multiblock finite-difference method was chosen for computational efficiency. To solve the equations on an arbitrary grid using the chosen method, the equations are transformed into generalized curvilinear coordinates using the chain rule. These equations are given in EQ16.

Boundary conditions for the problem must now be chosen. For this particular application, four boundary conditions were implemented: an inviscid wall boundary condition to represent the effect of the airfoil surface, an acoustic radiation inflow boundary with a specified gust distribution to allow the flow and gust to enter the domain and the noise to leave the domain, the Tam and Webb outflow condition to allow the flow, gust, noise, and airfoil wake to exit the downstream boundary, and a periodic boundary condition for the time direction. All of these boundary conditions are well-known, and are easily implemented in an STMA method.

The computational domain is then specified for this problem. The space-time volume of interest extends in space from the airfoil to a distance of at least 10 airfoil chord lengths away, to capture the nonuniform flow effects on the radiated noise. In time, since the gust geometry repeats at a single frequency, the domain extends from the start of one period of the incoming gust to the start of the next period of the incoming gust.

A grid is then generated for the problem. For this particular airfoil, a single-block C-grid is used. The C-grid begins at the lower outflow boundary, extends to the lower trailing edge of the airfoil, wraps around the airfoil to the upper trailing edge, and ends at the upper outflow boundary. In the time direction, the grid extends for one period of the gust, with the grid in the outgoing time direction transmitting data to the grid in the incoming time direction. The grid lines curve in both space and time, as shown in FIG. 9. This grid configuration is easy to generate and to specify the boundary conditions on.

An initial condition must then be specified; in this case, a uniform mean flow with the gust superposed on it is chosen as the initial condition. This is physically equivalent to an impulsive start condition.

These equations are then solved iteratively, in this case using an explicit Runge-Kutta scheme to update the solution after every iteration. The iterative process is continued until the process converges to a solution.

Below, as an example, is shown the structure of the STMA computer code used to calculate the results shown in FIGS. 9-16. This code is given as an example only, as there are many different ways to implement the STMA process in software, according to the methods disclosed herein by one skilled in the art of programming software for numerical solutions of engineering design problems using contemporary or future software design tools and methods. A more detailed coded embodiment is provided in the program listing appendix CD as a further example, incorporated herein by reference. The example code structure is:

```
        Program Calculate_STMA_Space_Time_Solution
        !------------read in the input file ----------------
1501        Call Read_Input_File
        !------------read in the grid file -----------------
1502        Call Read_Grid_File
        !---------give the STMA solver an initial guess at the solution--------
1503        Call Generate_Initial_Solution
            1503.1 Q(1) = rho
            1503.2 Q(2) = rho_u
            1503.3 Q(3) = rho_v
            1503.4 Q(4) = E
!------------ STMA iteration loop begins here--------------------------------
100    CONTINUE
        IF (Grid_Metrics_Needed) THEN
        !----calculate the metrics to determine the effect of grid mapping---
1504        Call Calculate_Grid_Metrics
        !-----calculate the spatial derivatives of the grid variables----------
        !----x derivatives---
        1504.1 Call Calculate_DxDxi
        1504.2 Call Calculate_DxDeta
        1504.3 Call Calculate_DxDtau    ! set to zero in non-STMA codes
        !----y derivatives---
        1504.4 Call Calculate_DyDxi
        1504.5 Call Calculate_DyDeta
        1504.6 Call Calculate_DyDtau    ! set to zero in non-STMA codes
        !----t derivatives---
        1504.7 Call Calculate_DtDxi     ! set to zero in non-STMA codes
        1504.8 Call Calculate_DtDeta    ! set to zero in non-STMA codes
        1504.9 Call Calculate_DtDtau    ! set to one in non-STMA codes
        !----Calculate the STMA grid metrics from the grid variable
            derivatives
        !----STMA Jacobian---
        1504.10 J = 1.0/(DxDxi*(DyDeta*DtDtau − DtDeta*DyDtau) &
                    +DxDeta*(DyDtau*DtDxi − DtDtau*DyDxi) &
                    +DxDtau*(DyDxi*DtDeta − DtDxi*DyDeta))
        !----STMA xi metrics---
        1504.11 DxiDx = J*(DyDeta*DtDtau − DtDeta*DyDtau)
        1504.12 DxiDy = J*(DtDeta*DxDtau − DxDeta*DtDtau)
        1504.13 DxiDt = J*(DxDeta*DyDtau − DyDeta*DxDtau)
        !----STMA eta metrics---
        1504.14 DetaDx = J*(DyDtau*DtDxi − DtDtau*DyDxi)
        1504.15 DetaDy = J*(DtDtau*DxDxi − DxDtau*DtDxi)
        1504.16 DetaDt = J*(DxDtau*DyDxi − DyDtau*DxDxi)
        !----STMA tau metrics---
        1504.17 DtauDx = J*(DyDxi*DtDeta − DtDxi*DyDeta)
        1504.18 DtauDy = J*(DtDxi*DxDeta − DxDxi*DtDeta)
        1504.19 DtauDt = J*(DxDxi*DyDeta − DyDxi*DxDeta)
        END IF ! grid metrics needed?
        IF (Itn_Step_Delta_Needed) THEN
        !---------Get the iteration step delta
1505        Call Calculate_Delta
            1505.1    U_contravariant = DxiDt + ((rho_u*DxiDx +
                        rho_v*DxiDy)/rho)
            1505.2    V_contravariant = DetaDt + ((rho_u*DetaDx +
                        rho_v*DetaDy)/rho)
            1505.3    W_contravariant = DtauDt + ((rho_u*DtauDx +
                        rho_v*DtauDy)/rho)
            1505.4    Pressure = (gamma-1)*(E −
                        0.5*(rho_u*rho_u+rho_v*rho_v)/rho)
            1505.5    Speed_of_Sound = SQRT(gamma * pressure/rho)
            1505.6    Denominator = ABS(U_contravariant) +
                        ABS(V_contravariant) + ABS(W_contravariant) +
                        Speed_of_Sound*SQRT(DxiDx*DxiDx +
                        DxiDy*DxiDy + DetaDx*DetaDx +
                        DetaDy*DetaDy + DtauDx*DtauDx + DtauDy*DtauDy)
            1505.7    delta = CFL/Denominator
        END IF ! delta needed?
        !------- Calculate the inviscid fluxes----------------------------
1506        Call Calculate_Fluxes
        !----calculate the pressure first-----
        1506.1    pressure = (gamma-1)*(E −
                    0.5*(rho_u*rho_u+rho_v*rho_v)/rho)
        !----calculate the x-direction (E) fluxes
        1506.2 E(1) = rho_u
        1506.3 E(2) = ((rho_u*rho_u)/rho) + pressure
        1506.4 E(3) = (rho_u*rho_v)/rho
        1506.5 E(4) = rho_u*((E + pressure)/rho)
        !----calculate the y-direction (F) fluxes
        1506.6 F(1) = rho_v
        1506.7 F(2) = (rho_u*rho_v)/rho
        1506.8 F(3) = ((rho_v*rho_v)/rho) + pressure
        1506.9 F(4) = rho_v*((E + pressure)/rho)
!------Impose boundary conditions-----------------------------
1507        Call Inviscid_Wall_Boundary_Condition
1508        Call Acoustic_Radiation_Inflow_Condition
1509        Call Tam_and_Webb_Outflow_Condition
!------- Calculate the residual; if we have the exact solution,
        the residual is zero---
1510        Call Calculate_STMA_Solution_Residual
        !----take derivatives of Q, E, and F vectors in all directions
        !----Q vector derivatives---
        1510.1 Call Calculate_DQDxi
        1510.2 Call Calculate_DQDeta
        1510.3 Call Calculate_DQDtau
        !----E flux vector derivatives---
```

-continued

```
        1510.4 Call Calculate_DEDxi
        1510.5 Call Calculate_DEDeta
        1510.6 Call Calculate_DEDtau
        !----F flux vector derivatives---
        1510.7 Call Calculate_DFDxi
        1510.8 Call Calculate_DFDeta
        1510.9 Call Calculate_DFDtau
        !----calculate DQDt
        1510.10  DQDt = DxiDt*DQDxi + DetaDt*DQDeta +
                 DtauDt*DQDtau
        !----calculate DEDx
        1510.11  DEDx = DxiDx*DEDxi + DetaDx*DEDeta +
                 DtauDx*DEDtau
        !----calculate DFDy
        1510.12  DFDy = DxiDy*DFDxi + DetaDy*DFDeta +
                 DtauDy*DFDtau
        !----calculate STMA solution residual
        1510.13 Solution_Residual = -(DQDt + DEDx + DFDy)
        !------Check if the residual is too large; if so,
              perform another iteration----------
        IF (Solution_Residual > Maximum_Allowable_Residual) THEN
        !----The example here uses Runge-Kutta explicit stepping to
           update the solution--
1511        Call Runge-Kutta_Solution_Update
            !----------update Q vector for next iteration
            1511.1 Q = Q + Runge_Kutta_factor * delta * Solution_Residual
               GO TO 100
        END IF
        !----------------Converged solution has been obtained---------------
1512    Call Write_Code_Output
        STOP
        END Program Calculate_STMA_Space_Time_Solution
```

The example STMA code shown above resembles, to a limited extent, the current state of the art codes to solve steady inviscid flow problems, with important differences in the calculation of the boundary conditions and fluxes used to transform such code to apply the STMA process. Accordingly, the new STMA process can be implemented in the framework of existing steady-state solution codes as a starting point. The example STMA code is written for space-time domains having two spatial dimensions (x and y), but the code can be easily extended to three or more spatial dimensions. The structure of the above example code is described as follows:

In step 1501, the code reads in the input file, which describes the computational problem.

In step 1502, the code reads the grid file, which describes the geometry of the problem in space-time.

In step 1503, the code generates an initial guess for the solution, which is used to start the iterative process used in this particular code.

In step 1504, the STMA code calculates the grid metrics, which specifies the transformation between the transformed coordinates ($\xi,\eta,\tau$) used in the calculation and the physical coordinates (x,y,t). It is important to note that an existing code, which maps space but not time, would set:

DxDtau=0

DyDtau=0

DtDtau=1 (EQ22)

In step 1505, the iteration update step A is calculated. Since this is an iterative code, the maximum update step possible at each point is used, which is known as local time stepping.

In step 1506, the iterative loop begins, and the inviscid fluxes associated with the current value of the flow variables are calculated.

The boundary conditions are applied to the solution in steps 1507, 1508, and 1509.

Then, in step 1510, the residual is calculated and checked to see if the solution has converged. Here, the residual of the solution is a measure of how well the computed solution satisfies the governing equations which the code is solving; as the residual decreases, the solution error decreases and the solution becomes a better approximation to the physical process that the equations are modeling. Note that the residual includes the time derivatives, and that the tau curvilinear coordinate is not specifically associated with the time direction.

If the residual of the solution is too large, the solution is updated in step 1511 using an explicit Runge-Kutta method, and the iteration loop beginning at step 1504 is repeated to evaluate the residual of the updated solution from step 1511.

Otherwise, the computed solution approximates the physical process adequately, the code output is written in step 1512, and the code run is stopped.

Once the solution has converged, the state variables contained in the solution can be used to calculate the data of interest from the state variables. In this case, the data of interest were the mean pressure on the airfoil surface, the root-mean-square (RMS) values of the unsteady pressure on the airfoil surface, and the acoustic intensity of the unsteady pressure on a circle of four airfoil chord lengths in radius, centered on the airfoil.

At this point, since the basic STMA procedure for the airfoil gust problem has been developed, a parametric study can be performed. In this case, for example, the gust geometry and frequency can be varied, the airfoil geometry and angle of attack can be varied, and the mean flow properties such as density, pressure, and velocities can be varied. With any or all of these variations, the STMA code can be run again, and the data of interest calculated for that case.

Using the data from these parametric studies, the airfoil shape and angle of attack, for example, can be modified to radiate the least amount of noise in a given direction for a given gust geometry. These parametric studies could even be automated, making the STMA method a module in a larger computer code. Since this benchmark problem is a reduced model for the problem of tone noise in jet aircraft engines, the practical application of the STMA method for developing quieter, more efficient jet engines can be seen.

Figure 17:
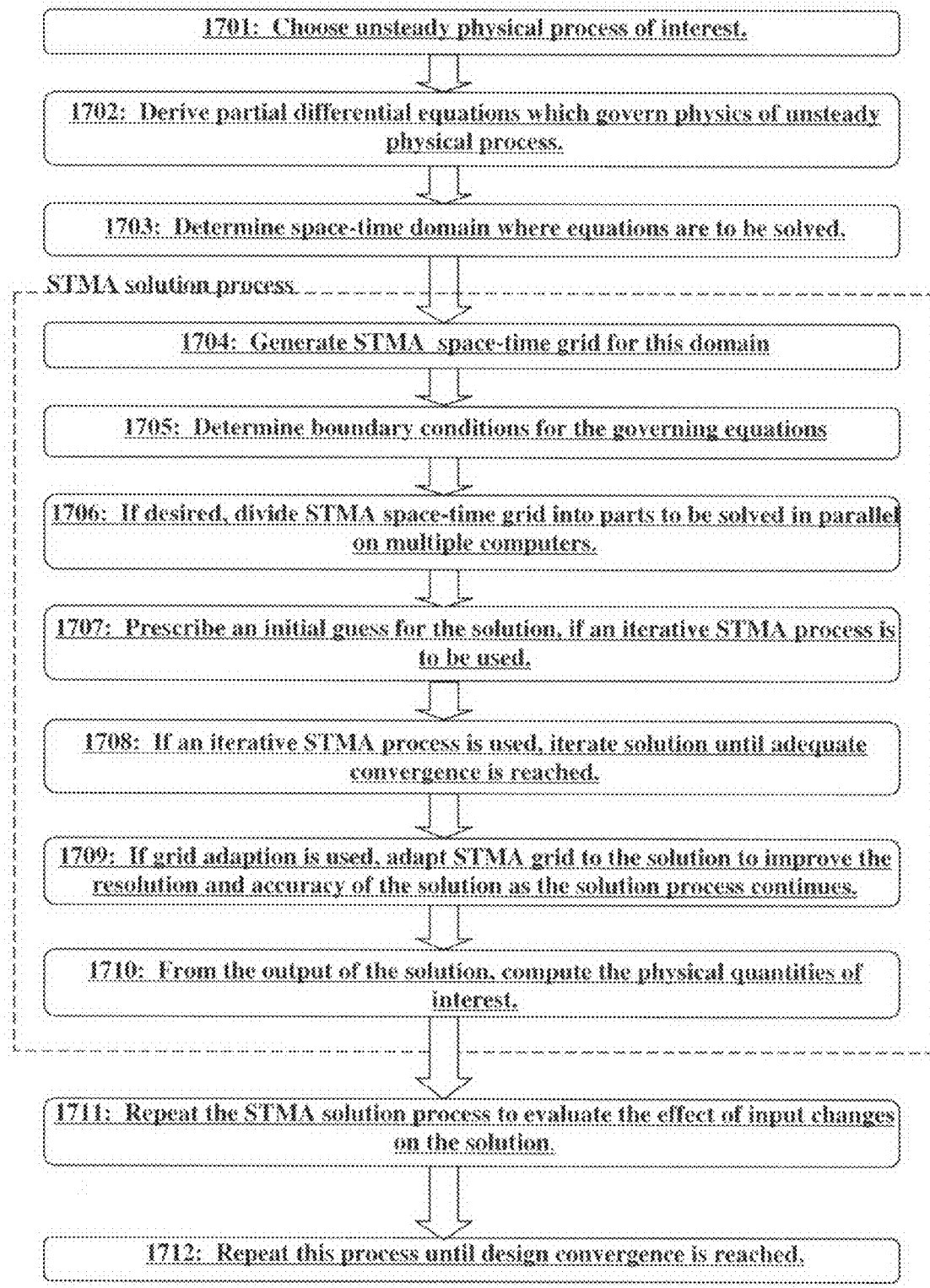
FIG. 17 shows a general flow chart for the new process applied to the solution of an unsteady partial differential equation representing an unsteady physical process, and the use of this solution process for improving the design of a manufactured product.

FIG. 17 is a more general flow chart showing where the new STMA method fits into the overall solution procedure for an unsteady physical process which is described by unsteady partial differential equations.

In step 1701, the problem is chosen. In this example, the problem chosen is that of the performance of an automobile engine.

In step 1702, the unsteady partial differential equations, which describe the problem, are formulated. The basic equations are known, and any modeling of the equations (such as turbulence models) is added here. This step is either done by hand, or using a mathematical symbol manipulation package. The resulting equations must then be programmed into the computer code used to solve the problem, or a computer code chosen which has been written to solve these equations. In this example, the equations are the Navier-Stokes equations for viscous fluid flow, with turbulence and chemistry models added.

In step 1703, the space-time volume where the equations are to be solved (the solution domain) is specified. In this example, the space-time volume is located in space from the engine air intake, through the cylinder, and to the end of the exhaust pipe. In time, the volume extends through one four-stroke cycle, and is periodic.

In step 1704, a grid is generated in this space-time volume. This grid is designed to accurately resolve the physics of the problem by clustering grid points in areas of rapid change in space-time (e.g., when and where the valves are opening) and placing few points in areas where the solution is not changing rapidly (e.g., in the center of the intake duct far upstream from the intake valve, when the intake valve is closed).

In step 1705, the boundary conditions, which describe the physical conditions at the boundaries of the space-time volume grid from step 1604, are specified. In this example, the boundary conditions to be determined are:

1. Wall boundary conditions for the solid walls.
2. An inflow condition for the engine intake.
3. An outflow condition for the engine exhaust.
4. A periodic condition for the time inflow and outflow boundaries.

These boundary conditions are programmed into the computer code used to solve the equations. These boundary conditions must be designed to work for a space-time iterative procedure.

In step 1706, the space-time domain is decomposed to be run in parallel on multiple computer processors if desired.

Step 1707 begins the actual computation of the problem by specifying an initial guess for the solution (assuming an iterative process is used). In this example, still air is specified initially, and the motion of the piston and valves causes air to move through the engine.

Step 1708 is the iterative process used to determine a solution to the unsteady partial differential equations. An example of this type of process is described above.

In step 1709, the distribution of the grid in the space-time volume of interest is revised in order to obtain a more accurate solution, if desired. This revision may occur as a part of the computer code that solves the equations and be applied during the iterative process, or may be separate from the code and applied after the current iterative process has converged.

At step 1710, the solution of the unsteady partial differential equations has been obtained, and the data of interest is calculated from the total solution. In this example, the performance data for the engine is calculated.

In step 1711, a parametric study is conducted to ascertain the effects of changes in the input conditions on the solution obtained. In this example, the valve timing of the engine may be varied, or the combustion chamber geometry, or a wide range of other parameters.

The results of this parametric study are used in step 1712 to improve the design of the physical process being modeled. In this example, a better design for the camshafts which open and close the engine valves could be determined.

Some portion of the STMA process and its various embodiments is typically implemented in software for execution on one or more computers, which can be a part of an engineering system for implementing STMA, for example, in an engineering improvement process. Any software used for STMA implementation can then be recorded on a computer readable medium for distribution. Such media include floppy discs, CD ROM, and any other forms of permanent or semi-permanent media used for software transport and/or storage. Especially lending itself to a computerized solution is the step of determining the values of the state variables by solving the unsteady partial differential or integral equations. However, many, if not all of the steps of the STMA process can be implemented by computer for various applications of the STMA process, especially as software and computer capabilities improve. Included in this application is a CD ROM containing one or more examples of implementations of the STMA process, or some subset thereof, coded into software. This CD ROM is incorporated herein by reference and is provided only as Ian example of one embodiment of the STMA process in software.

Various software tools already in existence can be utilized to develop the necessary software to implement STMA. By implementing the STMA process described herein in this manner, a computer model of a device or component undergoing physical processes and phenomena can be generated that is useful for improving the design of various physical components and devices, especially those that require detailed information about dynamic physical processes in order to be properly engineered. Examples of components and devices where such modeling could prove useful include aircraft wings and other aircraft components, automobile engines including reciprocating engines, manufacturing processes including the manufacturing of integrated circuits, along with many other possible examples. This method is not limited to these examples, but can be easily modified for use for modeling almost any physical system of interest, especially those physical systems where unsteady flows are encountered. Any such use of STMA clearly within the scope of this disclosure.

The invention has been described hereinabove using specific examples and implementations; however, it will be understood by those skilled in the art that various alternatives may be used and equivalents may be substituted for elements, components, or steps described herein, without deviating from the scope of the invention. Modifications may be necessary to adapt the invention to a particular situation or to particular needs without departing from the scope of the invention. It is intended that the invention not be limited to the particular implementations or software solutions described herein, but that the claims be given their broadest interpretation to cover all embodiments, literal or equivalent, covered thereby.

What is claimed is:

1. A method for predicting a resulting unsteady behavior from a manufactured or engineered component, said method comprising steps of:
    determining at least one governing unsteady partial differential or integral equation describing the unsteady behavior resulting from the component;
    determining a volume of space-time in which said unsteady behavior is to be obtained, said volume of space-time associated with a spatial geometry of the component over some period of time;
    discretizing the at least one equation to allow a numerical solution of the at least one equation in said space-time volume on a computational grid;
    generating said computational grid comprising cells or elements for at least partially filling said total volume of space-time, said cells or elements having faces which are oriented in any direction in space and time;
    placing said cells or elements in said total volume of space-time in such a manner so as to allow for said numerical solution, said cells or elements to be concentrated or clustered to adequately resolve the changing behavior of the component in space and time; and
    a computer generating data representing said prediction of the unsteady behavior by using the computer for solving said discretized at least one governing unsteady partial differential or integral equation on said computational grid, thereby providing said numerical solution; and said computer storing said data representing said prediction of the unsteady behavior, wherein said data represents the predicted unsteady behavior resulting from the manufactured or engineered component.

2. The method of claim 1, wherein said step of obtaining said prediction of unsteady behavior from the component is accomplished by using one or more computers.

3. The method of claim 1, wherein said obtaining said prediction of unsteady behavior from the component by solving said discretized at least one governing unsteady partial differential or integral equation on said computational grid is accomplished through an iterative solution or a direct solution of said at least one governing unsteady partial differential or integral equation on said computational grid.

4. The method of claim 1 further comprising the step of subdividing said total volume of space-time into a plurality of smaller domains, wherein said step of generating said computational grid is performed for each domain; and further wherein said step of obtaining said prediction of unsteady behavior from the component is performed for each domain.

5. The method of claim 4, wherein said step of obtaining said prediction of unsteady behavior from the component for each domain is accomplished by using one or more computers.

6. The method of claim 4, wherein said step of obtaining said prediction of unsteady behavior from the component for each domain is accomplished by computing said prediction of unsteady behavior from the component for each domain in sequence.

7. The method of claim 6, wherein said step of obtaining said prediction of unsteady behavior from the component for each domain in sequence is accomplished by using one or more computers.

8. The method of claim 4, wherein said step of obtaining said prediction of unsteady behavior from the component for each domain is accomplished by computing said prediction of unsteady behavior from the component for each domain in parallel.

9. The method of claim 8, wherein said obtaining said prediction of unsteady behavior from the component for each domain in parallel is accomplished by using one or more computers.

10. The method of claim 4, wherein, during said step of obtaining said prediction of unsteady behavior from the component for each domain, the computation for groups of domains is performed in sequence, whereas the computation for each domain in a given group of domains is performed in parallel; said computations performed by a plurality of computers.

11. The method of claim 1, wherein said computational grid utilizes an unstructured topology.

12. The method of claim 1, wherein said computational grid utilizes a block-structured topology.

13. The method of claim 1, wherein said computational grid is composed of a combination of structured and unstructured grid volumes.

14. The method of claim 1 using a multigrid solution technique to accelerate convergence.

15. The method of claim 1 further comprising the step of preconditioning said governing partial differential or integral equations to accelerate convergence.

16. The method of claim 1 using a Krylov-subspace method to accelerate convergence.

17. The method of claim 1 wherein, during said step of obtaining said prediction of unsteady behavior from the component, having a step of one or more of moving, enriching and refining said computational grid based on the evolution of the solution in said space-time volume.

18. The method of claim 1 wherein, during said step of obtaining said prediction of unsteady behavior from the component, having a step of one or more of moving, enriching, and refining said computational grid based on the distribution of error in the calculated solution in said space-time volume.

19. The method of claim 1 further including the step of using said prediction of unsteady behavior from the component to engineer an improved design of the component.

20. The method of claim 19 further including the step of iterating over the steps of the method of claim 19 until the final improved design of the component is satisfactory for actual implementation of a resulting component.

21. A method for predicting a resulting unsteady fluid dynamic behavior from a manufactured or engineered component, said method comprising steps of:
    determining one or more equations describing the unsteady fluid dynamic behavior resulting from the component;
    determining a total volume of space-time in which said unsteady fluid dynamic behavior is to be obtained, said volume of space-time associated with the geometry of the component over some period of time;
    discretizing the one or more unsteady flow equations to allow a numerical solution of the one or more unsteady flow equations in said space-time volume on a computational grid;
    generating said computational grid comprising cells or elements, said cells or elements having faces which are oriented in any direction in space and time;
    placing said cells or elements in said total volume of space-time in such a manner to allow for said numerical solution;
    a computer generating data representing said prediction of the unsteady fluid dynamic behavior by using the computer for solving said discretized one or more unsteady flow equations on said computational grid, thereby providing said numerical solution; and
    said computer storing said data representing said prediction of the unsteady fluid dynamic behavior, wherein said data represents the predicted unsteady fluid dynamic behavior resulting from the manufactured or engineered component.

22. The method of claim 21, wherein said one or more unsteady flow equations include one or more of Navier-Stokes equations of fluid flow.

23. The method of claim 21, wherein said one or more unsteady flow equations include one or more of simplified form of said Navier-Stokes equations of fluid flow.

24. The method of claim 21, wherein said one or more unsteady flow equations include one or more empirical modeling terms for unresolved flow phenomena.

25. The method of claim 21 further including the step of using said prediction of unsteady fluid dynamic behavior from the component to engineer an improved design of the component.

26. The method of claim 25 further including the step of iterating over the steps of the method of claim 25 until the improved design of the component is satisfactory for actual implementation of a resulting component.

27. The method of claim 21, wherein said unsteady flow equations include one or more of a density, a pressure, and a flow velocity.

28. The method of claim 21 applied to the prediction of the unsteady fluid dynamic behavior of a component for use inside a living organism.

29. A method for predicting a resulting unsteady time-dependent dynamical behavior from a manufactured or engineered component, said method comprising steps of:
- determining equations of structural dynamics describing the dynamical behavior resulting from the component;
- determining a period of time in which said dynamical behavior is to be obtained, thereby providing a volume of space-time associated with the geometry of the component over said period of time;
- discretizing the one or more equations of structural dynamics to allow numerical solution in said space-time volume on a computational grid;
- generating said computational grid comprising cells or elements, said cells or elements having faces which are oriented in any direction in space and time;
- placing said cells or elements in said volume of space-time in such a manner to allow for said numerical solution;
- a computer generating data representing said prediction of the unsteady dynamical behavior by using the computer for solving said discretized equations of structural dynamics on said computational grid thereby providing said numerical solution; and
- said computer storing said data representing said prediction of the unsteady time-dependent dynamical behavior, wherein said data represents the predicted unsteady time-dependent dynamical behavior resulting from the manufactured or engineered component.

30. A computer readable storage medium for storing a program for implementing the method of claim 29 on a computer.

31. The method of claim 29, wherein the one or more equations include one or more simplified form of the governing equations of structural dynamics.

32. The method of claim 29, said unsteady dynamical behavior of the component including one or more of deflection, stress, and strain of each structural member contained in the component in some period of time.

33. The method of claim 29, wherein said governing equations include empirical modeling terms to represent unresolved phenomena.

34. The method of claim 29 further including the step of using said prediction of unsteady dynamic behavior of the component to engineer an improved design of the component.

35. The method of claim 34 further including the step of iterating over the steps of the method of claim 34 until the improved design of the component is satisfactory for actual implementation of a resulting component.

36. A method for predicting a resulting time-dependent unsteady electromagnetic behavior from a component, said method comprising steps of:
- determining one or more electromagnetic equations describing said time-dependent unsteady electromagnetic behavior resulting from the component;
- determining a total volume of space-time in which the unsteady electromagnetic behavior is to be obtained, said volume of space-time associated with a geometry of the component over some period of time;
- discretizing the one or more electromagnetic equations to allow a numerical solution in said space-time volume on a computational grid;
- generating said computational grid comprising cells or elements, said cells or elements to have faces which are oriented in any direction in space and time;
- placing said cells or elements in said total volume of space-time in such a manner to allow for said numerical solution;
- a computer generating data representing said prediction of the unsteady electromagnetic behavior by using the computer for solving said discretized electromagnetic equations on said computational grid thereby providing said numerical solution; and
- said computer storing said data representing said prediction of the time-dependent unsteady electromagnetic behavior, wherein said data represents the predicted time-dependent unsteady electromagnetic behavior resulting from the component.

37. The method of claim 36, wherein said one or more electromagnetic equations include one or more Maxwell equations of electromagnetics.

38. The method of claim 36, wherein said one or more electromagnetic equations include one or more simplified form of the Maxwell equations of electromagnetics.

39. The method of claim 36, wherein said unsteady electromagnetic behavior from the component include one or more of a magnetic induction, a magnetic field, a displacement, and an electrical field.

40. The method of claim 36, wherein said one or more electromagnetic equations include empirical modeling terms to represent unresolved phenomena.

41. The method of claim 36 further including the step of using said prediction of unsteady electromagnetic behavior from the component to engineer an improved design of the component.

42. The method of claim 41 further including the step of iterating over the steps of the method of claim 41 until the improved design of the component is satisfactory for actual implementation of a resulting component.

43. A method for predicting a resulting time-dependent unsteady behavior from a component, said method comprising steps of:
- determining the molecular dynamics equations describing the time-dependent unsteady behavior resulting from the component;
- determining a total volume of space-time in which the unsteady behavior is to be obtained, said volume of space-time associated with a geometry of the component over some period of time;
- discretizing the molecular dynamics equations to allow numerical solution in said space-time volume on a computational grid;
- generating said computational grid comprising cells or elements, said cells or elements to have faces which are oriented in any direction in space and time;
- placing said cells or elements in said total volume of space-time in such a manner to allow for said numerical solution;
- a computer generating data representing said prediction of the unsteady behavior by using the computer for solving said discretized molecular dynamics equations on said computational grid thereby providing said numerical solution;
- said computer storing said data representing said prediction of the unsteady behavior, wherein said data represents the predicted unsteady time-dependent behavior resulting from the component.

44. The method of claim 43, wherein said one or more molecular dynamics equations include one or more Boltzmann equations of molecular dynamics.

45. The method of claim 43, wherein said one or more molecular dynamics equations include one or more simplified form of the Boltzmann equations of molecular dynamics.

46. The method of claim 43, wherein said one or more molecular dynamics equations include empirical modeling terms to represent unresolved phenomena.

47. The method of claim 43 further including the step of using said prediction of unsteady behavior from the component to engineer an improved design of the component.

48. The method of claim 47 further including the step of iterating over the steps of the method of claim 47 until the improved design of the component is satisfactory for actual implementation of a resulting component.

49. A method for aiding or improving the design of a manufactured or engineered component, said method comprising the steps of:
A. predicting a resulting unsteady behavior from the component, wherein the unsteady behavior from the component is describable by at least one governing unsteady partial differential or integral equation, said method providing time-dependent prediction of said unsteady behavior from the component, said method for prediction of an/said unsteady behavior from the component including steps of:
  determining the at least one partial differential or integral equation describing the unsteady behavior from the component;
  determining a total volume of space-time in which said prediction of unsteady behavior from the component is to be obtained, said volume of space-time associated with a geometry of the component over some period of time;
  discretizing the at least one partial differential or integral equation to allow a numerical solution of said at least one partial differential or integral equation in said volume on a computational grid;
  generating said computational grid comprising cells or elements, said cells or elements having faces which are oriented in any direction in space and time;
  placing said cells or elements in said total volume of space-time in such a manner so as to allow for said numerical solution; and
  obtaining said prediction of unsteady behavior from the component by using a computer for solving said discretized at least one partial differential or integral equation on said computational grid thereby providing said numerical solution; and
  said computer outputting information utilizing at least some portion of said numerical solution, said information describing some aspect of the predicted unsteady behavior from the component;
B. engineering a revised design of the component utilizing said information, wherein the component is redefined to encompass the revised design; and
C. iterating over steps A and B until a determination is made that the component is at a satisfactory or sufficient design state to stop iterating.

50. A system for implementing the method of claim 49, wherein said step of obtaining said prediction of unsteady behavior from the component is accomplished by using one or more computers.

51. The method of claim 1, wherein said step of discretizing said at least one equation is accomplished by using a finite difference procedure.

52. The method of claim 1, wherein said step of discretizing said at least one equation is accomplished by using a finite volume procedure.

53. The method of claim 1, wherein said spatial geometry of said component varies with time.

54. The method of claim 21, wherein said step of discretizing said at least one equation is accomplished by using a finite difference procedure.

55. The method of claim 21, wherein said step of discretizing said at least one equation is accomplished by using a finite volume procedure.

56. The method of claim 21, wherein said spatial geometry of said component varies with time.

57. The method of claim 29, wherein said step of discretizing said at least one equation is accomplished by using a finite difference procedure.

58. The method of claim 29, wherein said step of discretizing said at least one equation is accomplished by using a finite volume procedure.

59. The method of claim 29, wherein said spatial geometry of said component varies with time.

60. The method of claim 36, wherein said step of discretizing said at least one equation is accomplished by using a finite difference procedure.

61. The method of claim 36, wherein said step of discretizing said at least one equation is accomplished by using a finite volume procedure.

62. The method of claim 36, wherein said spatial geometry of said component varies with time.

63. The method of claim 43, wherein said step of discretizing said at least one equation is accomplished by using a finite difference procedure.

64. The method of claim 43, wherein said step of discretizing said at least one equation is accomplished by using a finite volume procedure.

65. The method of claim 43, wherein said spatial geometry of said component varies with time.

66. The method of claim 49, wherein said step of discretizing said at least one equation is accomplished by using a finite difference procedure.

67. The method of claim 49, wherein said step of discretizing said at least one equation is accomplished by using a finite volume procedure.

68. The method of claim 49, wherein said spatial geometry of said component varies with time.

69. The method of claim 49, wherein said unsteady behavior is the behavior of an environment within which the component is used.

70. The method of claim 49, wherein said unsteady behavior is related to the behavior of the component itself.

71. A computer readable storage medium for storing a program for implementing the method of claim 49 on a computer.

72. The method of claim 1, wherein said unsteady behavior is the behavior of an environment within which the component is used.

73. The method of claim 1, wherein said unsteady behavior is related to the behavior of the component itself.

74. A computer readable storage medium for storing a program for implementing the method of claim 1 on a computer.

75. The method of claim 21, wherein said unsteady behavior is the behavior of an environment within which the component is used.

76. The method of claim 21, wherein said unsteady behavior is related to the behavior of the component itself.

77. A computer readable storage medium for storing a program for implementing the method of claim 21 on a computer.

78. The method of claim 29, wherein said unsteady behavior is the behavior of an environment within which the component is used.

79. The method of claim 29, wherein said unsteady behavior is related to the behavior of the component itself.

80. A computer readable storage medium for storing a program for implementing the method of claim 29 on a computer.

81. The method of claim 36, wherein said unsteady behavior is the behavior of an environment within which the component is used.

82. The method of claim 36, wherein said unsteady behavior is related to the behavior of the component itself.

83. A computer readable storage medium for storing a program for implementing the method of claim 36 on a computer.

84. The method of claim 43, wherein said unsteady behavior is the behavior of an environment within which the component is used.

85. The method of claim 43, wherein said unsteady behavior is related to the behavior of the component itself.

86. A computer readable storage medium for storing a program for implementing the method of claim 43 on a computer.

* * * * *